United States Patent [19]

Suzuki et al.

[11] Patent Number: 5,636,866
[45] Date of Patent: Jun. 10, 1997

[54] SHOCK ABSORBING STRUCTURE FOR MOTOR VEHICLE

[75] Inventors: Takane Suzuki; Hiroshi Tomida, both of Toyota, Japan

[73] Assignee: Kojima Press Industry Co., Ltd., Japan

[21] Appl. No.: 530,678

[22] Filed: Sep. 19, 1995

[30] Foreign Application Priority Data

| Sep. 21, 1994 | [JP] | Japan | 6-226507 |
| Sep. 21, 1994 | [JP] | Japan | 6-226508 |
| Apr. 28, 1995 | [JP] | Japan | 7-105143 |

[51] Int. Cl.[6] ................................. B60R 21/02
[52] U.S. Cl. .................. 280/748; 296/146.7; 296/189; 188/376
[58] Field of Search ............................ 296/188, 189, 296/146.6, 146.7; 280/748, 751, 752; 293/133, 136; 188/376, 377

[56] References Cited

U.S. PATENT DOCUMENTS

| 4,413,856 | 11/1983 | McMahan et al. | 296/188 |
| 4,769,951 | 9/1988 | Kaaden | 49/502 |
| 4,786,100 | 11/1988 | Kleemann et al. | 296/146 |
| 5,026,787 | 6/1991 | Takagi et al. | 525/391 |
| 5,102,163 | 4/1992 | Ishikawa | 280/751 |
| 5,154,445 | 10/1992 | Weller | 280/751 |
| 5,221,782 | 6/1993 | Aida et al. | 524/451 |
| 5,306,068 | 4/1994 | Nakae et al. | 296/189 |
| 5,356,177 | 10/1994 | Weller | 280/751 |
| 5,433,478 | 7/1995 | Naruse | 280/751 |
| 5,462,144 | 10/1995 | Guardiola et al. | 188/377 |

FOREIGN PATENT DOCUMENTS

| 60-22345 | 11/1985 | Japan . | |
| 63-8046 | 1/1988 | Japan . | |
| 5-288232 | 4/1992 | Japan | B60R 21/02 |
| 6-72153 | 3/1994 | Japan . | |
| 6-247199 | 9/1994 | Japan . | |
| 7-52735 | 2/1995 | Japan . | |

*Primary Examiner*—David M. Mitchell
*Assistant Examiner*—Jonathan J. Yun
*Attorney, Agent, or Firm*—Parkhurst, Wendel & Burr, L.L.P.

[57] ABSTRACT

A shock absorbing structure for a motor vehicle, including a base plate having a thickness greater than 1.5 mm, and a plurality of ribs formed so as to constitute a latticework on one of opposite major surfaces of the base plate. The latticework has a plurality of rectangular cells each having two pairs of adjacent sides. The ribs have a thickness in a range of 0.6–1.2 mm. One of the two adjacent sides of each cell of the latticework of the ribs has a first length of 30–50 mm, and the other side has a second length greater than 30 mm and not greater than 50 mm. The base plate and ribs are formed of a synthetic resin material comprising polyolefin, which material has an Izod impact strength of not smaller than 5 kgcm/cm, and a tangent modulus of elasticity in a range of 5000–20000 kg/cm$^2$.

8 Claims, 23 Drawing Sheets

SHOCK ABSORBING STRUCTURE FOR MOTOR VEHICLE

BACKGROUND OF THE INVENTION

1. Field of the Invention

The present invention relates in general to a shock absorbing structure to be attached to a component of a motor vehicle, such as a door panel or a quarter panel, and more particularly to such a shock absorbing structure which has excellent formability and is able to effectively absorb impact energy when the vehicle component hits a vehicle passenger or driver upon collision from an accident.

2. Discussion of Related Art

Conventionally, a shock absorbing structure is attached to a component of a motor vehicle or other motor vehicle, such as a bumper or an instrument panel, so as to absorb shocks applied to the vehicle and a vehicle passenger or driver, in particular, his or her head, upon collision from an accident, for example, thereby to assure improved safety of the passenger or driver (hereinafter referred to "vehicle passenger").

In recent years, a door panel, a quarter panel and the like are also required to have a shock absorbing function as described above, for absorbing shocks against the pelvic and breast parts of the vehicle passenger, in particular, so as to assure a higher level of safety of the passenger. In particular, a new side impact standard, FMVSS (Federal Motor Vehicle Safety Standards) 214, took effect in the United States, and strict regulations have been imposed on injury levels with respect to the pelvic and breast parts of a dummy passenger, which are actually measured in the side impact test.

To meet the above requirement and standard, there have been various proposals which include: (1) attaching a urethane pad to the inside of a door panel or the rear side of a quarter panel, (2) attaching to such a component a foamed body which has beads and is formed of polypropylene or polystyrene, instead of the urethane pad, (3) re-modeling or re-designing the structure of the door panel, so that the door panel per se functions as a shock absorbing structure, and (4) attaching a rib structure of a synthetic resin to the inside of the door panel or the rear side of the quarter panel.

In the shock absorbing structure according to the above proposal (1), the urethane pad has a limited freedom of design in its configuration or shape and also suffers from insufficient strength, and the pad must therefore be attached to a door panel or a quarter panel, at its entire surface by means of an adhesive or the like. This results in deteriorated handling ease and increased cost of the panel. Further, the urethane pad usually has maximum deformation percentage of as low as about 70%, and the maximum impact energy that can be absorbed by the urethane pad is accordingly limited. In other words, "impact displacement" of the urethane pad is limited to about 70%. Accordingly, the shock absorbing structure using the urethane pad cannot sufficiently absorb a relatively large impact energy. Namely, the impact resilience of the urethane pad is comparatively large, and the load per unit displacement is inevitably large.

In the shock absorbing structure according to the above proposal (2), the foamed body with beads, which is formed of a thermoplastic resin, can be bonded to a desired component by heat application, and can be easily recycled. However, the foamed body of such a thermoplastic resin has relatively low strength and a relatively small impact displacement, and therefore suffers from the same problems as the urethane pad structure according to the proposal (1). Thus, the proposed structure (2) is not satisfactory or desirable for use as a shock absorbing structure.

In the shock absorbing structure according to the above proposal (3), the re-designing of the door panel structure is limited by the desired appearance requirements of the vehicle. That is, the structure of the door panel must be designed so as to absorb the impact energy as needed, while maintaining the required shapes and positions of an arm rest, a loud speaker, a door pocket and the like which are installed or provided on the door panel. It is thus considerably difficult to achieve the object according to the proposal (3).

On the other hand, the rib structure made of a synthetic resin according to the above proposal (4) has a higher degree of freedom in the choice of the shape and material thereof, and may be therefore formed with various mounting holes or attachment members. Therefore, the rib structure can be easily attached by screws or bolts or by fitting engagement, to the inside of the door panel or the rear side of the quarter panel, for example. Alternatively, the rib structure can be formed integrally with a trim or other part of the door panel. Thus, the attachment of the rib structure to a vehicle component can be accomplished with greater ease and efficiency, as compared with the shock absorbing structure having the urethane pad or the foamed body. In addition, the amount of the impact energy that can be absorbed by the rib structure can be freely controlled to a desired value without changing the shape and structure of the door panel.

Examples of the rib structure made of a synthetic resin, which has been conventionally used as a shock absorbing structure for a motor vehicle, include a rib structure for a bumper as disclosed in JP-B2-4-36894, and a rib structure for an instrument panel as disclosed in JP-B2-4-25177. However, these rib structures have some problems as described later, and cannot be used as a shock absorbing structure for a door panel or quarter panel of the motor vehicle, for example.

FIG. 12 shows a rib structure 20 as disclosed in JP-B2-4-36894, which is a hollow body having an integrally formed rib 22. The rib 22 protrudes inwards and has a concave portion 24 which is open outwards. As shown in FIG. 12, the rib structure 20 is accommodated within a bumper 21. The rib structure 20 is formed by blow molding, this process involves a relatively large number of process steps and a cumbersome molding procedure, and tends to suffer from uneven thickness of the formed walls. It is thus difficult to form such a rib structure having sufficiently high shock absorbing capability. Further, the hollow rib structure 20 undergoes different amounts of deformation or displacement at different portions thereof upon application of impact forces thereto in different directions, resulting in a variation in the amount of the impact energy that can be absorbed by the structure 20, depending upon the direction in which the impact energy acts on the structure. Thus, the rib structure 20 cannot be used as a reliable shock absorbing structure.

To minimize the variation in the amount of the impact energy absorbed by the rib structure 20, it is proposed to increase the number of ribs, and arrange those ribs so as to form a grid or lattice structure. When the rib structure 20 is formed of a conventionally used material, however, the thickness of the ribs must be as small as about 0.4–0.6 mm, so as to ensure a desired shock absorbing function. Such thin-walled rib structure cannot be efficiently manufactured in a large quantity.

FIG. 13 shows a rib structure 26 as disclosed in JP-B2-4-25177, which has a planar base plate 28, and a plurality of ribs 30 formed on one surface of the base plate 28 such that the ribs 30 are spaced apart from each other at a suitable spacing interval. The rib structure 26 is attached via an intermediate plate 36 to a pad 34 which serves as a front covering of an instrument panel 32. When an impact force is applied to this rib structure 26, the ribs 30 are deflected, and the amount of the impact energy absorbed by the structure 26 gradually increases with the amount of deflection of the ribs 30. Therefore, the ribs 30 must have a large maximum amount of deflection, so as to increase the amount of the impact energy that can be absorbed by the rib structure 26. This results in an increased size of the whole structure 26, and makes it difficult to install the structure 26 in a relatively small space within a door panel or on the rear side of a quarter panel.

Thus, the rib structure 26 as described above cannot satisfactorily serve as a shock absorbing structure to be installed on a door panel or a quarter panel, for absorbing the impact energy when the door panel or quarter panel hits the pelvic or breast part of a vehicle passenger. To ensure safety of the vehicle passenger by efficient absorption of the impact energy by the shock absorbing structure installed within a limited space, the shock absorbing structure is required to provide impact displacement of at least 80%, and exhibit a stable shock absorbing characteristic (load-displacement characteristic or relationship) that suits a particular component of the motor vehicle to which the shock absorbing structure is applied.

It is generally desirable that the amount of displacement or deflection S of the rib structure and the resilient force or load F produced upon displacement due to an impact force be linearly proportional with each other, as indicated in the graph of FIG. 22A. It is also desirable that the ratio F/S (corresponding to the F-S relationship line as indicated in FIG. 22A) be not greater than 0.5. On the other hand, the conventional rib structure tends to exhibit a load-displacement relationship (F-S relationship) as indicated by curves "a" and "b" in the graph of FIG. 22B. These curves mean a considerably large initial load value, that is, excessively large load value F when the amount of displacement of the rib structure is relatively small.

A rib structure made of a synthetic resin and installed within a door panel is also disclosed in JP-A-6-72153, which is shown in FIG. 23. This rib structure generally indicated at 94 in FIG. 23 is associated with a door trim 92 for a door panel body 90. The rib structure 94 includes a plurality of relatively thin-walled planar ribs 96 formed on the inner surface of the door trim 92 as integral parts of the door trim 92, so as to extend toward the door panel body 90. The ribs 96 are spaced apart from each other and have different height dimensions so that the ribs 96 have different rigidity values.

When an impact force acts on the rib structure 94 in a direction that causes the door panel body 90 and the door trim 92 to move toward each other, the ribs 96 are forced against the door panel body 90. As a result, the ribs 96 having the relatively large height dimensions and relatively small rigidity values are deflected, deformed or fractured, before the ribs 96 having the relatively small height dimensions and relatively large rigidity values. Thus, the total load F on the rib structure 94 increases as the amount of displacement S of the rib structure 94 as a whole increases. Thus, the rib structure 94 is capable of functioning as a shock absorbing structure which exhibits an almost optimum load-displacement characteristic for protecting the pelvic and breast parts of the vehicle passenger.

When the impact force acts on the rib structure 94 in the direction in which the ribs extend in parallel with each other, that is, in the direction perpendicular to the plane of view of FIG. 23, the impact energy can be more or less effectively absorbed by the ribs 96. However, there is a problem when the impact force acts on the rib structure 94 in the direction (vertical direction as seen in FIG. 23) in which the ribs 96 are spaced apart from each other. In this case, the impact energy cannot be sufficiently absorbed by the ribs 96. Thus, the rib structure 94 suffers from a considerable variation in the shock absorbing capability, depending upon the direction of input of the impact force.

Regarding the rib structure 26 shown in FIG. 13, it is also noted that the ribs 30 formed on the base plate 28 desirably have a comparatively small wall thickness so that the ribs 30 are effectively deformed or fractured to efficiently absorb the impact energy. Generally, the rib structure 26 is formed by injection molding or compression molding, which gives the base plate 28 ribs 30 uniform wall thickness over the entire length or surface area thereof, which in turn assures comparatively high shock absorbing stability of the rib structure 26. However, the rib structure 26 suffers from some problems in the process of manufacture as explained below.

When it is desired to increase the impact displacement of the rib structure 26 to improve the shock absorbing capability, or where the rib structure 26 is installed in a relatively large space within a certain component of a motor vehicle, the thin-walled ribs 30 are required to be formed with a comparatively large height dimension. In this case, the cavities which are formed in a mold to form the respective ribs 30 have a comparatively small width dimension corresponding to the thickness of the ribs 30 and a comparatively small depth dimension corresponding to the height dimension of the ribs 30. In molding the rib structure 26, it is difficult to adequately fill those mold cavities with an appropriate molten resin material, and the ribs 30 formed tend to have flaws such as voids and buckling.

For improved shock absorbing stability of the rib structure 26, each rib 30 should desirably have a constant thickness value over the entire height dimension. This means a reduced draft angle of the rib structure 26, which leads to increased difficulty of removing the formed rib structure 26 from the mold in the molding process.

It is also noted that the optimum load-displacement relationship or characteristic of the rib structure as described above varies depending upon the particular environment in which the rib structure is used.

SUMMARY OF THE INVENTION

It is therefore an object of the present invention to provide a shock absorbing structure for a motor vehicle, which has excellent formability, provides a sufficiently large impact displacement, and exhibits an excellent shock absorbing characteristic, while effectively avoiding a variation in the amount of absorption of the impact energy depending upon the direction in which an impact force is applied to the structure.

The above object may be accomplished according to a first aspect of the present invention, which provides a shock absorbing structure for a motor vehicle, comprising a base plate having a thickness greater than 1.5 mm, and a plurality of ribs formed on one of opposite major surfaces of the base plate. The ribs constitute a latticework having a plurality of rectangular cells each of which has two pairs of two adjacent sides. Each rib has a wall thickness in a range of 0.6–1.2 mm, and one of the two adjacent sides of each cell of the latticework has a first length of 30–50 mm, and the other cell having a second length greater than 30 mm and not greater than 50 mm. The base plate and the ribs are formed of a synthetic resin material comprising polyolefin. The synthetic resin material has an Izod impact strength of not smaller than 5 kgcm/cm, and a tangent modulus of elasticity in a range of 5000–20000 kg/cm².

The shock absorbing structure constructed according to the present invention is formed of a particular resin material, i.e., a polyolefin resin material, and is formed with the predetermined dimensions as described above, so that the structure provides an impact displacement or stroke of 80% or greater, and exhibits a shock absorbing characteristic or relationship in which its load value is kept substantially constant within a predetermined range that corresponds to a vehicle component to which the structure is attached. Further, the amount of shock to be absorbed by the shock absorbing structure does not significantly vary depending upon the local portion of the structure at which the structure receives an impact force, namely, depending upon the direction of application of the impact force to the structure. Accordingly, if the present structure is used for a door panel or a quarter panel of a motor vehicle, the structure is able to effectively and stably absorb an impact energy when the door panel or quarter panel hits a vehicle passenger, in particular, the pelvic part of the passenger's body. Moreover, the shock absorbing structure of the invention has significantly improved formability, and can therefore be easily produced at a relatively low cost.

Preferably, the synthetic resin material has a melt flow rate of not smaller than 20 g/10 min. In this case, the resin material exhibits an improved flow characteristic when it is in a molten state, thus assuring further improved formability of the structure.

It is also preferable that each of the ribs of the latticework has a draft angle in a range of 0.2°–1°. In this case, the strength of the ribs is made substantially uniform in the direction of height of the ribs, whereby the amount of the impact energy that can be absorbed by the present structure is less likely to vary in the height direction of the ribs.

The shock absorbing structure is preferably formed by injection molding, using the synthetic resin material. The injection molding requires a reduced number of process steps as compared with the conventional blow molding, and thus permits a more efficient molding operation, and permits the present shock absorbing structure to be produced with significantly improved efficiency.

Preferably, the ribs are formed integrally with the base plate. In this case, the base plate and the ribs are less likely to be separated from each other in use.

The base plate may be provided with a pair of mounting portions for attachment to a desired component of the motor vehicle. In this case, the structure can be easily and efficiently attached to or assembled with the vehicle component, by means of bolts, for example.

It is a second object of this invention to provide a shock absorbing structure for a motor vehicle, which exhibits a load-displacement relationship wherein the load on the structure changes substantially linearly with the displacement of the structure, and which has substantially consistent shock absorbing capability without an influence by the direction in which the structure receives an impact force.

The above second object may be accomplished according to a second aspect of the present invention, which provides a shock absorbing structure for a motor vehicle, which is formed of a synthetic resin material, comprising a base plate, and a plurality of ribs formed on one of opposite major surfaces of the base plate. The ribs comprise flexible ribs. At least an upper portion of each of the flexible ribs has a dimension as measured in a plane parallel to the major surfaces, which dimension decreases toward an upper end of the upper portion. The flexible ribs lie in a plurality of planes which intersect each other.

In the shock absorbing structure according to the second aspect of the present invention, at least some of the ribs formed on one major surface of the base plate are flexible, and the dimension of at least an upper portion of each flexible rib as measured in a plane parallel to major surfaces of the base plate gradually decreases in the direction from the lower end toward the upper end of the flexible rib. At the same time, these flexible ribs are located or lie in a plurality of planes which intersect each other. These planes may be perpendicular to the major surfaces of the base plate. The thus constructed shock absorbing structure exhibits a desired load-displacement characteristic in which the load value is proportional to the amount of displacement. Further, the above arrangement makes it possible to minimize a variation of the shock absorbing characteristic of the structure, which variation occurs due to a change in the direction in which an impact force is applied to the structure, whereby the structure is able to effectively and stably absorb an impact energy, and protect a vehicle passenger, in particular, his or her breast, against the impact force.

In one preferred form of the second aspect of the present invention, the plurality of ribs formed on the base plate include first ribs arranged in a plurality of first rows and second ribs arranged in a plurality of second rows which intersect the first rows. The number of the second ribs in each of the second rows is almost equal to that of the first ribs in each of the first rows. This arrangement assures substantially the same shock absorbing capability of the shock absorbing structure when the impact force is applied to the structure in the different directions parallel to the first and second rows of the ribs.

In another preferred form of the second aspect of the invention, the plurality of ribs formed on the base plate include radial ribs which extend in a radial direction in a plane parallel to the opposite major surfaces of the base plate. In this case, the radial ribs are oriented in two or more different directions, and are effective to reduce a variation in the shock absorbing capability or characteristic of the shock absorbing structure depending upon the direction in which the impact force acts on the structure.

The base plate may be provided with a pair of mounting portions for attaching the shock absorbing structure to a component of the motor vehicle. In this case, the structure can be easily and efficiently attached to or assembled with the vehicle component, by means of bolts, for example.

Further, the present shock absorbing structure may be installed on a vehicle component such that upper ends of the ribs are located on the side of the interior of the motor vehicle. In this case, the structure exhibits a desired load-displacement characteristic.

It is a third object of this invention to provide a shock absorbing structure for a motor vehicle, which is constructed to facilitate formation of ribs even where the ribs have a large height dimension.

The above third object may also be accomplished according to a third aspect of the present invention, which provides a shock absorbing structure for a motor vehicle, which is formed of a synthetic resin material, comprising a base plate, and a plurality of first ribs formed on one of opposite major surfaces of the base plate, and a plurality of second ribs formed on the other of the opposite major surfaces of the base plate.

When an impact force is applied to the shock absorbing structure constructed as described above, the first and second ribs are fractured or deformed so as to effectively and stably absorb an energy due to the impact force. Since the first and second ribs are formed on both of the opposite major surfaces of the base plate in the above-described shock absorbing structure, the height of the individual first and second ribs can be advantageously reduced as compared with the height of the ribs in the conventional shock absorbing structures in which the ribs are formed on only one major surface of the plate. Further, the total height of the first and second ribs can be increased to a relatively large extent to provide a comparatively large impact displacement, by increasing the heights of the first and second ribs by relatively small amounts. That is, the heights of the first and second ribs need not be considerably large so as to achieve a desired total height of the first and second ribs. To form the present shock absorbing structure by using a mold, cavities for forming forming the first and second ribs need not have large depth dimensions, whereby the conventionally experienced failure to fill the mold cavities with the resin material can be avoided. Thus, the present shock absorbing structure can be formed by molding with improved formability, without suffering from incomplete molding or warpage of the formed structure. Further, since the heights of the individual ribs are relatively small as described above, it is not necessary to give the ribs a relatively small draft angle to assure a uniform thickness of the ribs. That is, the ribs may be given a relatively large draft angle, which facilitates removal of the formed structure from the mold.

In the shock absorbing structure as described above, the total height of the first and second ribs can be significantly increased while assuring high formability and permitting easy removal of the formed structure from the mold. The increase in the total height of the first and second ribs leads to an increased impact displacement, and eventually an increased amount of impact energy that can be absorbed by the structure. The shock absorbing structure with the ribs having a high total height dimension is particularly favorably used as a shock absorber to be attached to a vehicle component, such as a door panel or a quarter panel, which has a relatively large installation space for the shock absorbing structure. Due to the large total height of the first and second ribs, the present shock absorbing structure is able to effectively and easily absorb the impact energy when the door panel or quarter panel hits a vehicle passenger, in particular, the pelvic part of the passenger's body.

In one preferred form of the third aspect of the present invention, the first ribs formed on one major surface of the base plate and the second ribs formed on the other major surface of the plate have different deformation or fracture strength values. For example, the first ribs have a smaller deformation or fracture strength value than the second ribs. In this case, only the first ribs are deformed or fractured when the impact force is less than a certain level, and the second ribs begin to be deformed or fractured when the impact force has reached the certain level. Alternatively, the first and second ribs may be arranged so that the rate of deformation or fracturing of the first ribs is different from that of the second ribs.

In the case where the first and second ribs have different fracture or deformation strength values, the shock absorbing characteristic of the first ribs and that of the second ribs may be determined independently of each other, so that the shock absorbing characteristic of the whole structure is tuned or adjusted as needed, so as to deal with different impact force values.

To give the first and second ribs different deformation or fracture strength values, the first ribs and second ribs may have different thickness values. Alternatively, the spacing distance of the first ribs may be made different from that of the second ribs, so that the first and second ribs have different deformation or fracture strength values. Further, the first and second ribs may have different height dimensions to have different strength values.

In another form of the shock absorbing structure according to the third aspect of the invention, the first ribs constitute a first latticework or honeycomb body having a plurality of rectangular cells, while the second ribs constitute a second latticework or honeycomb pattern having a plurality of rectangular cells which have different dimensions.

BRIEF DESCRIPTION OF THE DRAWINGS

The above and optional objects, features and advantages of the present invention will be better understood by reading the following description of presently preferred embodiments of the invention, when considered in connection with the accompanying drawings, in which.

DETAILED DESCRIPTION OF THE PREFERRED EMBODIMENTS

Figure 1:
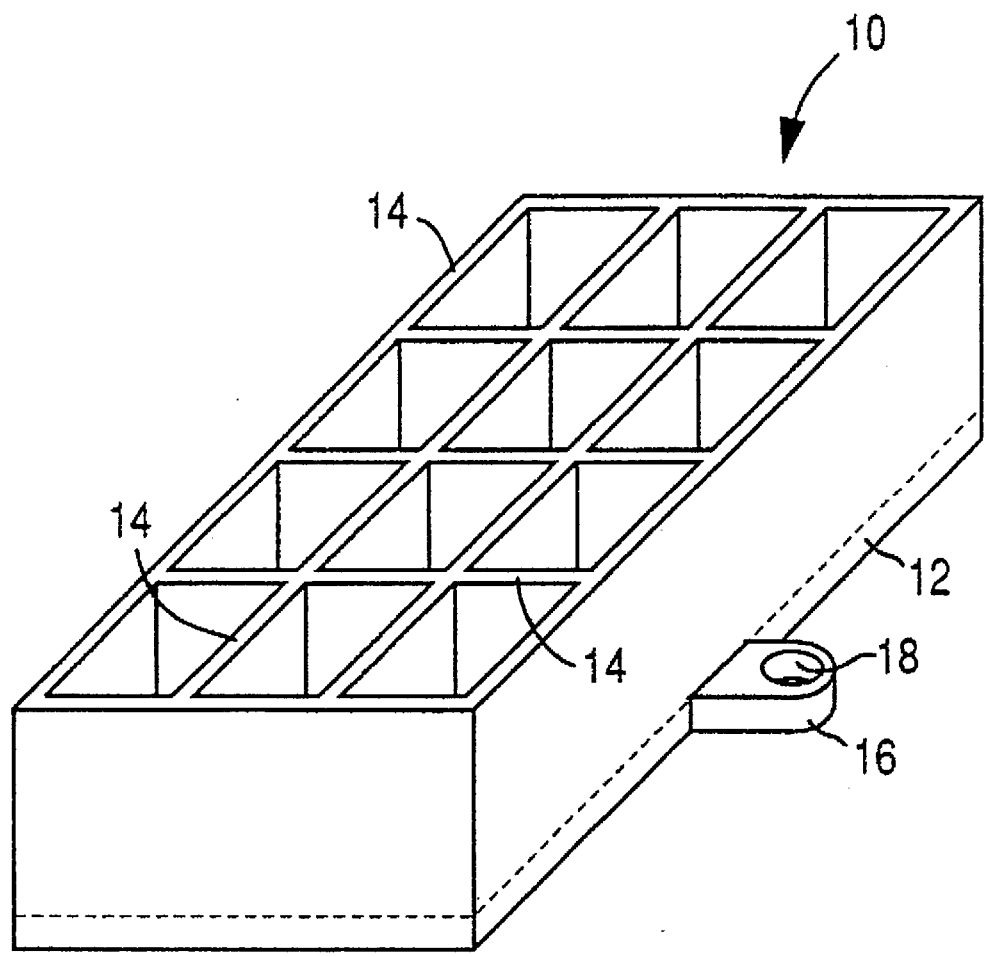
FIG. 1 is a perspective view showing a shock absorbing structure for a motor vehicle, which is constructed according to one preferred embodiment of the present invention.

Referring first to FIG. 1, there is shown a shock absorbing structure 10 for an automobile constructed according to a first preferred embodiment of the present invention. The shock absorbing structure 10 has a generally box-like configuration, and includes a rectangular base plate 12, and a latticework or honeycomb body consisting of a plurality of ribs 14 arranged in a grid pattern on the base plate 12. The ribs 14 consist of four parallel longitudinal walls and five transverse walls which cooperate to define a matrix of rectangular cells of the latticework. Each rectangular cell has two pairs of two adjacent sides. The base plate 12 and the ribs 14 are formed integrally with each other.

Described more specifically, the base plate 12 of the shock absorbing structure 10 has a thickness which is greater than 1.5 mm. The shock absorbing structure 10 is designed so that when an impact force or shock due to collision of the vehicle is applied to the shock absorbing structure 10, the base plate 12 and the ribs 14 are efficiently fractured at the same time, whereby an impact energy generated by the impact force is effectively and stably absorbed by the structure 10. If the thickness of the base plate 12 is not greater than 1.5 mm, only the base plate 12 is fractured by the impact force, prior to fracturing of the ribs 14, and the impact energy cannot be absorbed by the structure 10 with high stability. It is thus difficult for the structure 10 to absorb a desired amount of the impact energy if the thickness of the base plate 12 is too small.

If the thickness of the base plate 12 is too large, on the other hand, the time required for molding the plate 12 is increased, and the ribs 14 are deformed due to a shrinkage difference between the ribs 14 and the base plate 12 when cooled in the molding process. This makes it difficult to control or prevent warping or buckling of the base plate 12, and that of the shock absorbing structure 10 as a whole. Upon application of an impact force to the shock absorbing structure 10, therefore, the state or degree of fracture of the structure 10 differs at different local portions thereof, and the impact energy cannot be absorbed with high stability or uniformity. Thus, the shock absorbing structure 10 is not able to absorb a desired amount of the impact energy if the thickness of the base plate 12 is too large. Namely, the thickness of the base plate 12 is desirably controlled to be less than 5 mm.

The size of the base plate 12 is not particularly limited but may be determined as desired, depending upon the size of an automobile component on which the shock absorbing structure 10 is installed, or an installation space available for the structure 10, for example. In the case where the present structure 10 is attached to the inside of a door panel or the rear side of a quarter panel, for example, the base plate 12 generally has a length of about 150 mm and a width of about 90 mm.

Figure 2:
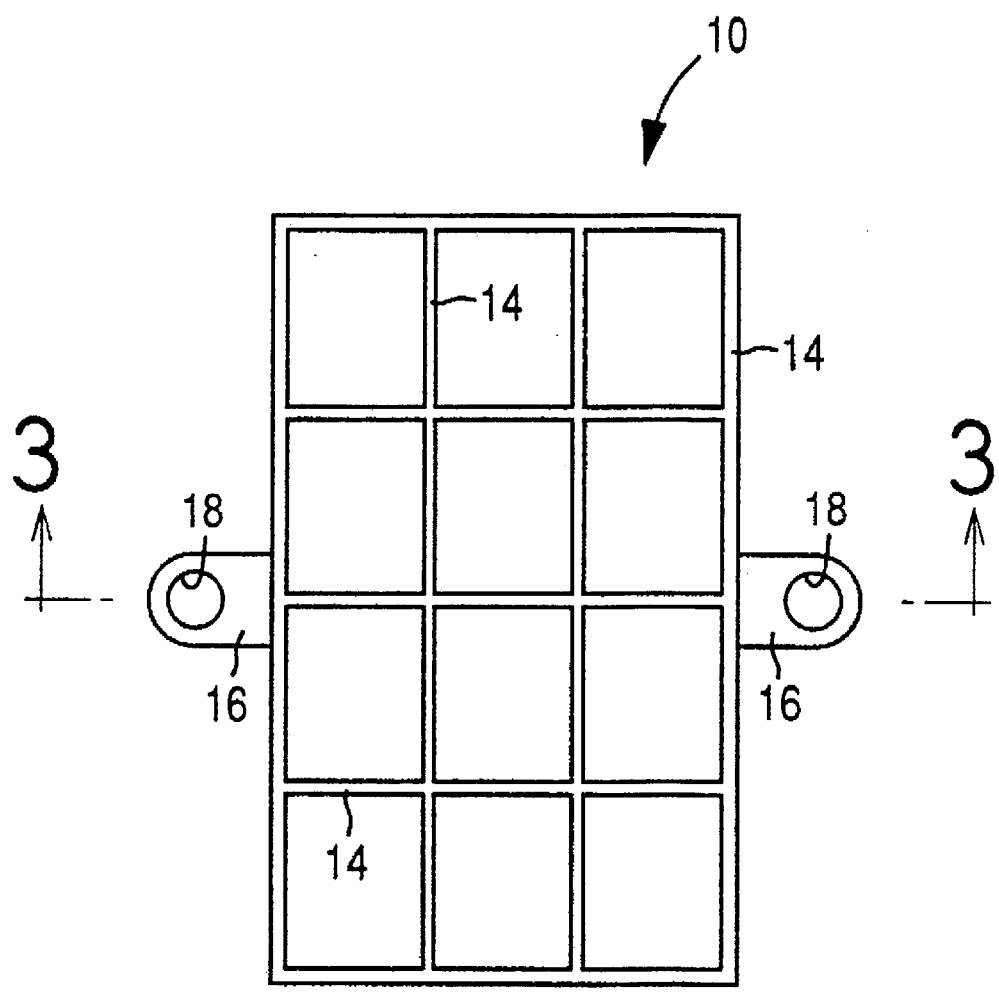
FIG. 2 is a top plan view showing the shock absorbing structure of FIG. 1.
Figure 3:
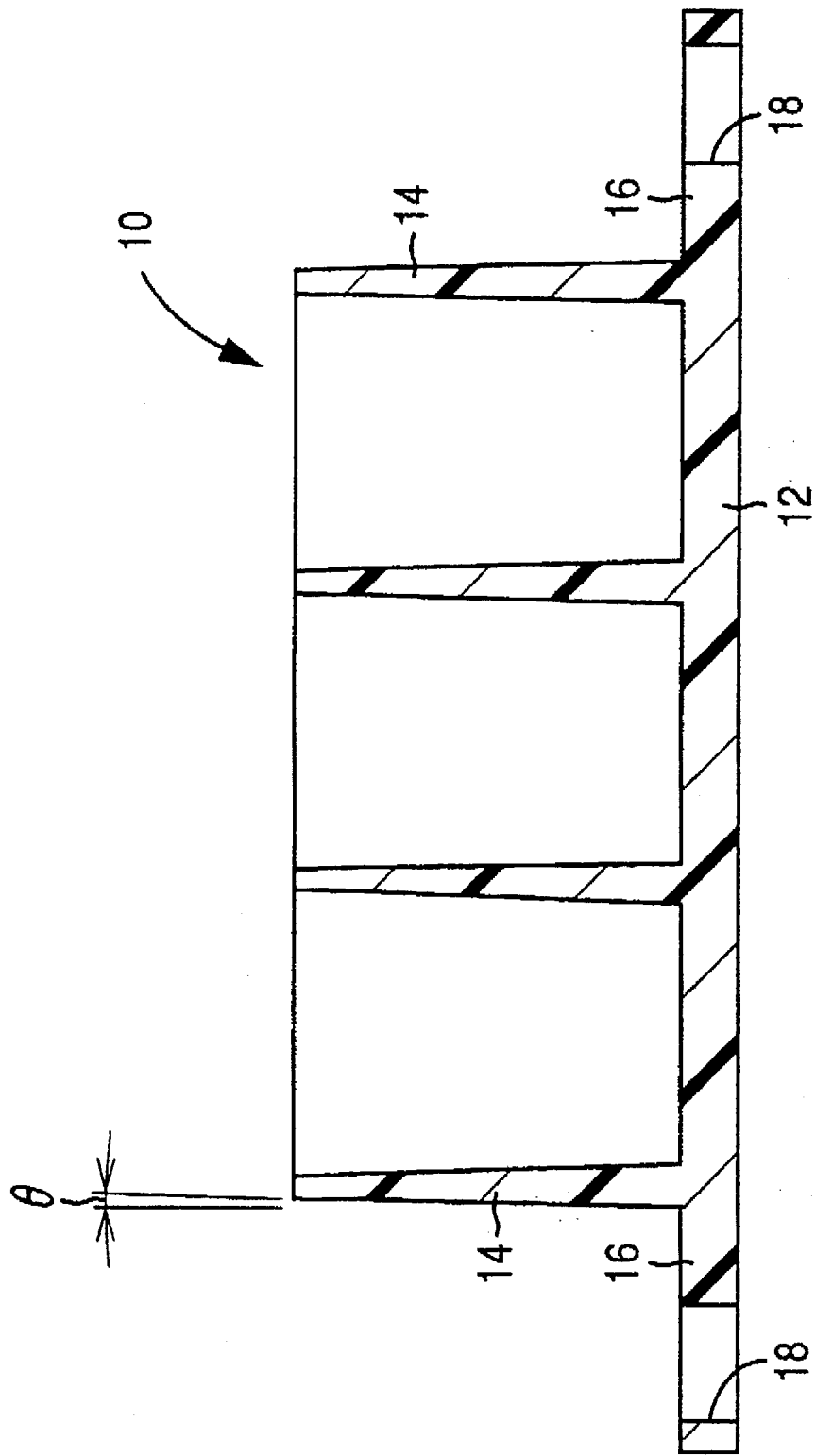
FIG. 3 is an enlarged cross sectional view taken along 3—3 in FIG. 2.

As shown in FIGS. 2 and 3, a pair of ears 16, 16 are formed integrally with the base plate 12 such that the ears 16, 16 protrude a suitable distance from the respective opposite longitudinal end faces. These ears 16, 16 have respective holes 18, 18 for receiving bolts, by which the shock absorbing structure 10 is fixedly attached to or assembled with a desired automobile component. Instead of providing the ears 16, 16, a suitable adhesive may be applied to a surface of the base plate 12 opposite to the surface on which the ribs 14 are formed. In this case, the shock absorbing structure 10 is bonded by the adhesive to the desired automobile component.

Each of the ribs 14 has a wall thickness in the range of 0.6 mm to 1.2 mm. If the thickness of the ribs 14 is smaller than 0.6 mm, that is, if the ribs 14 are too thin, it is difficult to mold or form the ribs 14, resulting in reduced efficiency of manufacture of the shock absorbing structure 10. If the thickness of the ribs 14 exceeds 1.2 mm, on the other hand, that is, if the ribs 14 are too thick, the impact energy cannot be absorbed by fracture of the ribs 14 with sufficiently high efficiency. In view of the above, the thickness of the ribs 14 is desirably held within a range of 0.7 mm to 1.0 mm.

As described above, the longitudinal and transverse walls of the ribs 14 cooperate to constitute a latticework or honeycomb body having a plurality of rectangular cells on one of the opposite surfaces of the base plate 12. In this latticework of the ribs 14, one of the two adjacent sides of each rectangular cell has a length of 30–50 mm, while the other side has a length greater than 30 mm but not greater than 50 mm. With the ribs 14 thus arranged as the latticework, the shock absorbing structure 10 does not suffer from a variation in the amount of absorption of the impact energy depending upon the specific local portion of the structure 10 to which the impact force is applied. In this respect, it is desirable to reduce the size of each rectangular cell of the latticework of the ribs 14, that is, desirable to provide a relatively large number of small cells. When the size of the cells of the latticework is reduced, however, the thickness of the ribs 14 must also be reduced so that the shock absorbing structure 10 can absorb a desired amount of the impact energy, without increasing the impact resilience, namely, without increasing the load or stress per unit displacement of the ribs 14. Accordingly, the lengths of the two adjacent sides of each cell of the grid pattern are preferably controlled to fall within the ranges specified above, so as to minimize a variation in the amount of the impact energy that can be absorbed at different portions of the structure 10, depending upon the direction in which the impact force acts on the structure 10.

Figure 4:
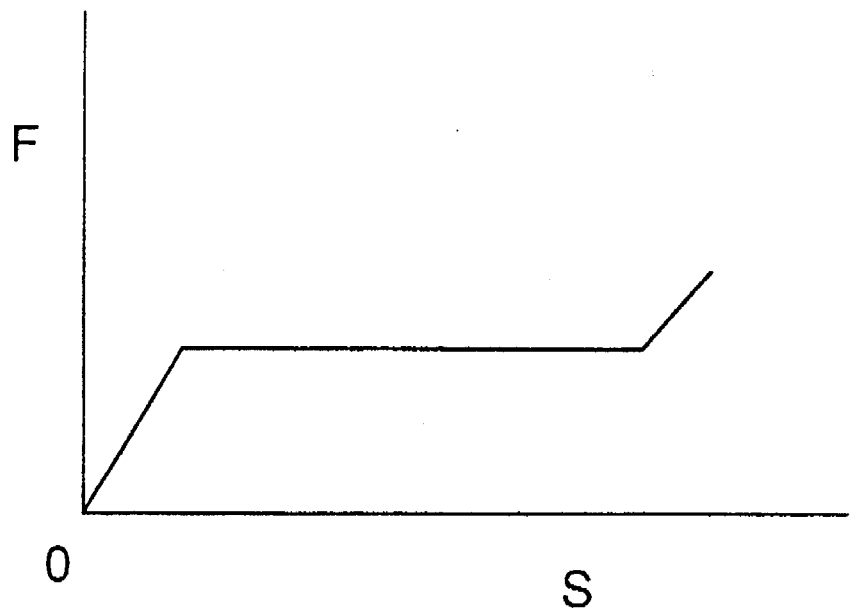
FIG. 4 is a graph indicating a load-displacement relationship of the shock absorbing structure of FIG. 1.

The height dimension of the ribs 14 is suitably determined depending upon, for example, the size of the automobile component on which the shock absorbing structure 10 is installed, or an installation space in which the structure 10 is installed. Where the present structure 10 is attached to the inside of the door panel or the rear side of the quarter panel, for example, the ribs 14 usually have a height of about 50 mm.

Where the installation space available for the shock absorbing structure 10 is limited, it is desirable that the amount of impact energy that can be absorbed by unit amount of displacement or fracture of the structure 10 be as large as possible. On the other hand, it is desirable that the shock absorbing structure 10 have a large effective displacement stroke or impact displacement value, and that the load acting on the structure 10 be kept substantially constant irrespective of an increase in the displacement beyond a certain upper limit. Described more specifically, the load is desirably kept within a range of about 2 kN whose upper limit which is determined depending upon the specific component to which the structure 10 is attached. Further, the structure 10 desirably has impact displacement of at least 80%. That is, the load value F and the displacement S desirably have a relationship as indicated in the graph of FIG. 4.

To obtain the above-indicated optimum F-S relationship between the load value and the displacement, the shock absorbing structure 10 is formed of a polyolefin resin material, which has an Izod impact strength of not smaller than 5 kgcm/cm, and a tangent modulus of elasticity of 5000–20000 kg/cm$^2$. The Izod impact strength is measured in an Izod impact test conducted according to ASTM (American Society for Testing Material) D 256, and the tangent modulus of elasticity is measured in a bending strength test conducted according to ASTM D 790.

Figure 5:
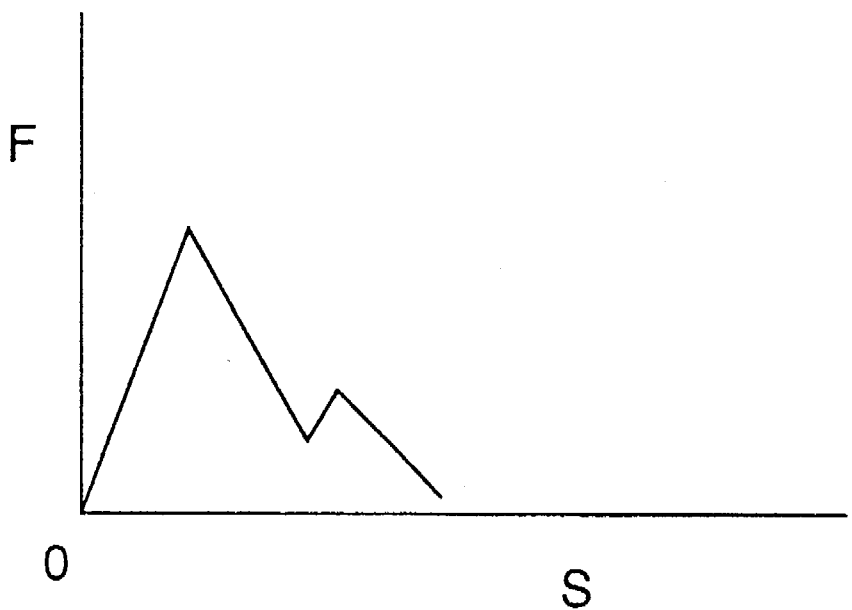
FIG. 5 is a graph indicating a load-displacement relationship of a comparative shock absorbing structure having Izod impact strength of less than 5 kgcm/cm.
Figure 6:
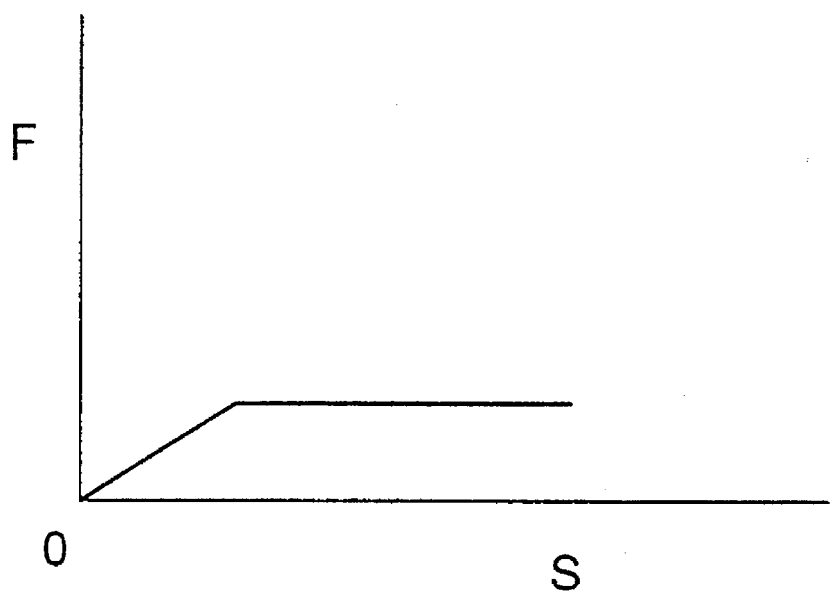
FIG. 6 is a graph indicating a load-displacement relationship of another comparative shock absorbing structure having tangent modulus of elasticity of less than 5000 kg/cm$^2$.
Figure 7:
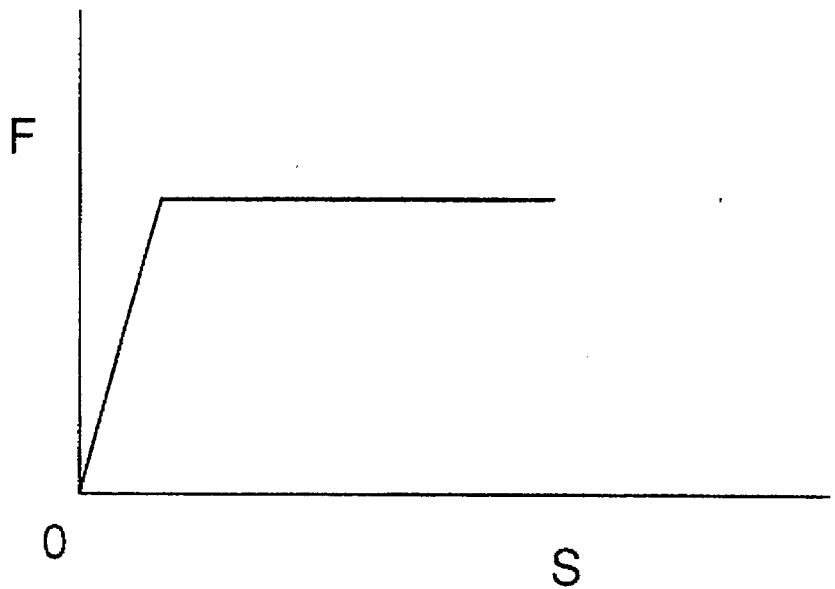
FIG. 7 is a graph indicating a load-displacement relationship of a further comparative shock absorbing structure having tangent modulus of elasticity larger than 20000 kg/cm$^2$.
Figure 8:
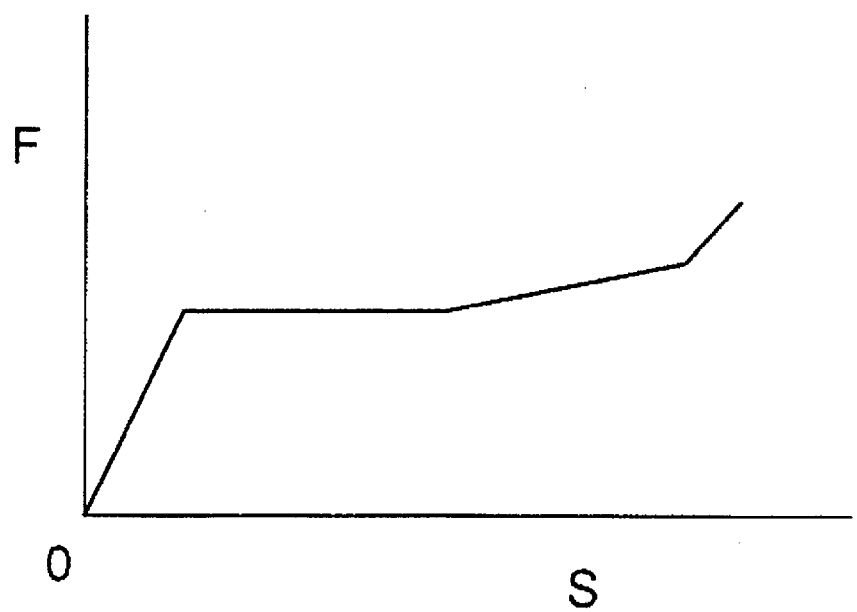
FIG. 8 is a graph indicating a load-displacement relationship of Example 1 of the present invention.
Figure 9:
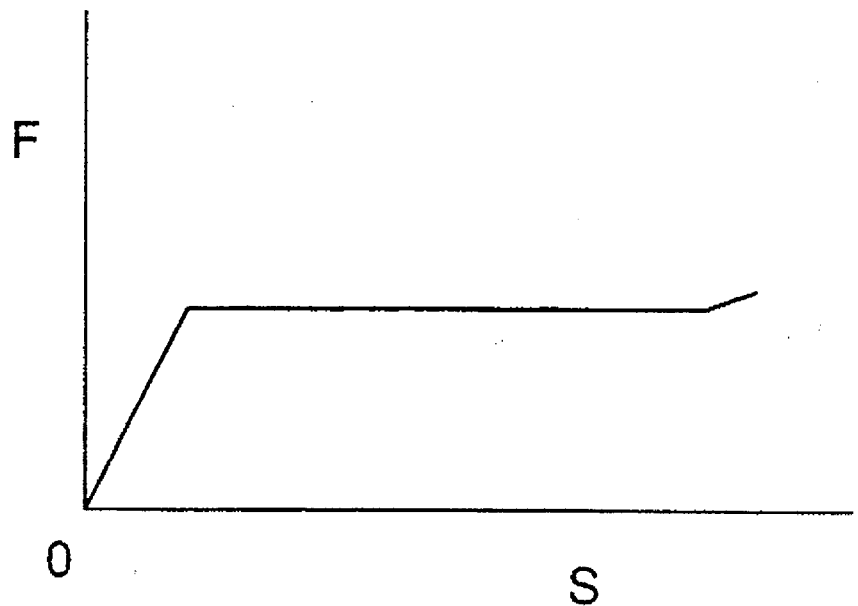
FIG. 9 is a graph indicating a load-displacement relationship of Example 2 of the present invention.
Figure 10:
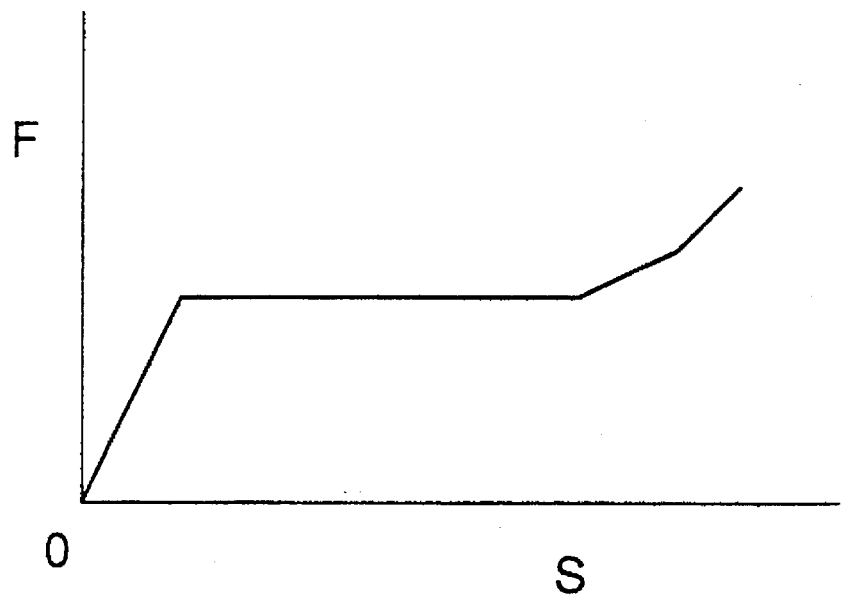
FIG. 10 is a graph indicating a load-displacement relationship of Example 3 of the present invention.
Figure 11:
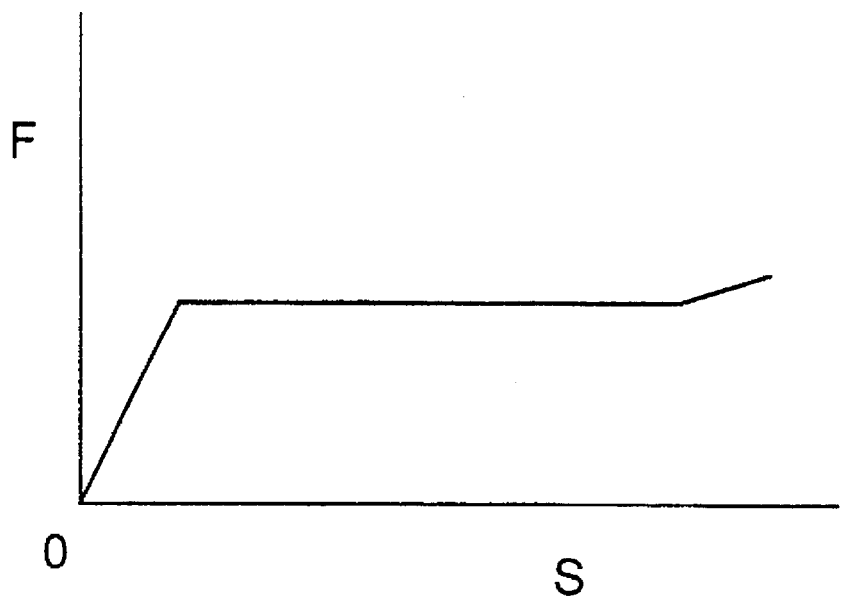
FIG. 11 is a graph indicating a load-displacement relationship of Example 4 of the present invention.
Figure 12:
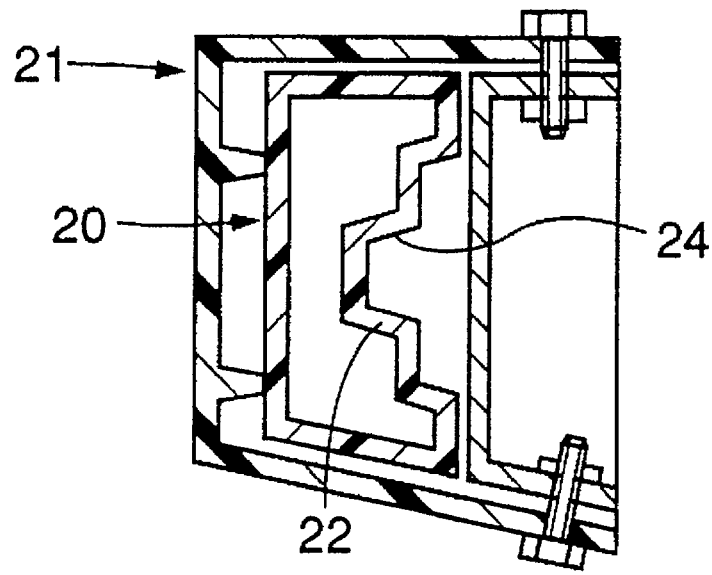
FIG. 12 is a cross sectional view showing one example of a conventional shock absorbing structure for a motor vehicle.
Figure 13:
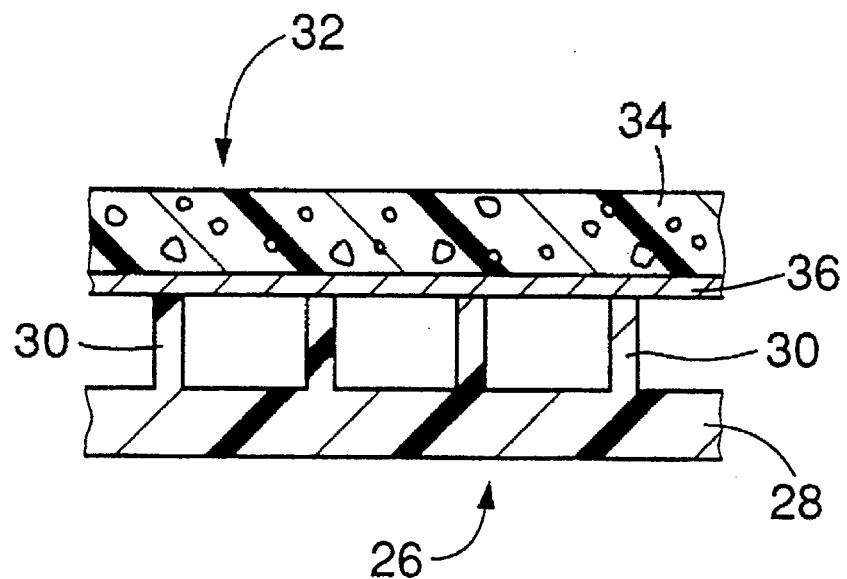
FIG. 13 is a cross sectional view showing another example of a conventional shock absorbing structure for a motor vehicle.

If the shock absorbing structure 10 is formed of a synthetic resin other than polyolefin resin, the structure 10 does not provide a sufficiently large impact stroke for absorbing an impact force. If the Izod impact strength of the material used for the structure 10 is less than 5 kgcm/cm, the rate of fracture of the structure 10 is increased due to the low impact strength, and the structure 10 exhibits a load-displacement relationship or characteristic as shown in the graph of FIG. 5. In this case, the impact energy cannot be uniformly absorbed by fracturing of the structure 10. If the tangent modulus of elasticity of the material used is less than 5000 kg/cm$^2$, the initial load value is reduced, resulting in a load-displacement relationship as shown in the graph of FIG. 6, and the structure is less likely to absorb a desired amount of the impact energy. If the tangent modulus of elasticity is greater than 20000 kg/cm$^2$, the initial load value is excessively increased, resulting in a load-displacement relationship as shown in the graph of FIG. 7, which indicates that the load value exceeds a predetermined upper limit.

In sum, a polyolefin resin having excellent ductility is selected as a synthetic resin material for forming the shock absorbing structure 10, so as to provide a sufficiently large impact displacement. Further, a suitable degree of brittleness is given to the highly ductile polyolefin resin, and the Izod impact strength and the tangent modulus of elasticity are held in the respective predetermined ranges, so that the load value of the structure 10 is kept substantially constant within a predetermined range irrespective of an increase of the amount of displacement thereof.

The polyolefin resin material may be favorably selected from polyethylene, polypropylene, block copolymers thereof, random copolymers thereof, and polymer alloys thereof. To the polyolefin material, there may be added in suitable proportions a rubber material such as an ethylene-propylene-diene copolymer, a filler such as talc, mica, calcium carbonate, glass fiber or wollastonite, and other additives such as hindered amine or BHT, for example. Due to the addition of the additives, the shock absorbing structure 10 is effectively given increased light resistance, heat resistance and strength and improved properties, as well as the intended shock absorbing capability, which are required when used as a component of an automobile, for example.

The shock absorbing structure 10 made of the polyolefin resin material and having the above-described shape and dimensions is preferably produced by compression molding or injection molding. In particular, the injection molding requires reduced number of the process steps, as compared with the blow molding conventionally used to produce a rib structure made of a synthetic resin, thus permitting easy and efficient molding to form the structure 10. Further, the thus formed structure 10 is free from a variation in the wall thickness thereof, and is thus capable of absorbing the impact energy with high stability.

In any of the above molding methods, the polyolefin resin material used for the molding preferably has a melt flow rate of at least 20 g/10 min. If the melt flow rate is lower than that lower limit value, it is difficult to form the base plate 12 and ribs 14 with such small wall thicknesses as indicated above.

It is also desirable that the draft angle θ of each rib 14 as indicated in FIG. 3 be held within a range of 0.2°–1°. If the draft angle is less than 0.2°, it may be difficult to remove the formed rib structure 10 from the mold. If the draft angle θ exceeds 1°, the thickness of the proximal portions of the ribs 14 adjacent to the base plate 12 is likely to be much larger than that of the distal portions of the ribs 14 remote from the plate 12, resulting in a difference in the strength between the proximal and distal portions of the ribs 14. Consequently, the strength or impact resistance is greater at the proximal portions of the ribs 14 adjacent to the base plate 12, than at the distal portions remote from the base plate 12, leading to undesirable shock absorbing characteristic of the structure 10.

Although the base plate 12 and the latticework of the ribs 14 may be formed separately and then bonded together into the shock absorbing structure 10, this method of manufacture may cause the base plate 12 and the latticework of the ribs 14 to be separated at bonding interface when an impact force is applied to the structure 10. As a result, the impact energy cannot be stably absorbed by the structure 10. Accordingly, the shock absorbing structure 10 is desirably formed as an integral body consisting of the base plate 12 and the ribs 14 integral with the base plate 12.

The thus obtained shock absorbing structure 10 may be attached to a component of an automobile, such as a door trim, quarter panel, pillar garnish, door grab, instrument panel, or cluster, by means of bolts or the like at the ears 16, 16, or bonded to the component. If possible, the shock absorbing structure 10 may be integrally incorporated in or formed as an integral part of the automobile components.

In the shock absorbing structure according to the present invention, a latticework or honeycomb body consisting of a plurality of ribs is formed on one of the major opposite surfaces of a bottom plate having a thickness of greater than 1.5 mm, and one of the two adjacent sides of each rectangular cell of the latticework has a length in the range of 30–50 mm, while the other side has a length greater than 30 mm and not greater than 50 mm. Upon application of an impact force to the present shock absorbing structure, the bottom plate and the ribs are fractured with high efficiency, and the impact energy can be absorbed by the structure with high stability, without suffering from a variation in the amount of the absorbed energy depending upon the local portion of the structure which receive the impact force. Since the wall thickness of the ribs is held in the range of 0.6–1.2 mm, the shock absorbing structure can be produced with high formability and efficiency. Further, the use of the polyolefin resin material having the Izod impact strength of 5 kgcm/cm and the tangent modulus of elasticity of 5000–20000 kg/cm$^2$ enables the shock absorbing structure to provide impact displacement of at least 80%, while keeping the load value (impact resilience) substantially constant within the nominal range that is predetermined depending upon a component of an automobile to which the structure is attached. Consequently, the present shock absorbing structure can effectively and stably absorb the impact energy when a door panel or quarter panel hits a vehicle passenger or driver (hereinafter referred to as "vehicle passenger"), in particular, pelvic part of the passenger's body. Further, the structure can be easily produced with high efficiency, at a relatively low cost.

EXAMPLES

There will be described some examples according to the above-described embodiment of the present invention. It is however to be understood that the invention is by no means limited to the details of these examples, but may otherwise embodied with various changes, modifications and improvements, which may occur to those skilled in the art, without departing from the scope of the invention as defined in the appended claims.

Initially, five kinds of polypropylene (PP-1 through PP-5) having respective Izod impact strengths and tangent moduli of elasticity as indicated in TABLES 1 and 2 were prepared in suitable amounts for use as polyolefin resin materials. The Izod impact strength was measured according to ASTM D 256, while the tangent modulus of elasticity was measured according to ASTM D 790.

TABLE 1

|  | PP-1 | PP-2 | PP 3 |
|---|---|---|---|
| Izod impact strength (kgcm/cm) | 9.4 | 7.2 | 11.1 |
| Tangent modulus of elasticity (kg/cm$^2$) | 5500 | 13600 | 9100 |

TABLE 2

|  | PP-4 | PP-5 |
|---|---|---|
| Izod impact strength (kgcm/cm) | 4.2 | 3.2 |
| Tangent modulus of elasticity (kg/cm$^2$) | 20000 | 22000 |

Then, the above five kinds of polypropylene (PP-1~PP-5) were used to form twenty examples of a shock absorbing structure by injection molding in which the resin was heated to 210° C. Each example was shaped such that a plurality of ribs were formed to constitute a latticework or honeycomb body on one surface of a base plate. For each of the twenty examples, the wall thicknesses of the base plate and ribs, and dimensions L1 and L2 of the adjacent two sides of each rectangular cell of the latticework are indicated in TABLES 3 and 4. The dimensions L1 and L2 are measured in a plane parallel to the major surfaces of the base plate. In Examples 1–10 according to the present invention, the shock absorbing structures were formed of any one of the three kinds of polypropylene resin (PP-1, PP-2 and PP-3) having the properties according to the present invention. In Comparative Examples 11–20, the shock absorbing structures were formed of either of the other two kinds of polypropylene (PP-4 and PP-5) having the properties outside the ranges of the present invention, or formed of any one of the above three kinds (PP-1, PP-2 and PP-3) but were formed with the cell dimensions L1, L2 outside the ranges of the present invention.

TABLE 3

| EXAMPLES ACCORDING TO THE INVENTION | | | | |
|---|---|---|---|---|
|  | Material | Thickness of base plate (mm) | Thickness of ribs (mm) | Cell Dimensions of Latticework | |
|  |  |  |  | L1 | L2 |
| 1 | PP-1 | 3 | 0.8 | 40 | 30 |
| 2 | PP-2 | 3 | 0.6 | 40 | 30 |
| 3 | PP-1 | 3 | 0.8 | 50 | 30 |
| 4 | PP-2 | 3 | 0.8 | 50 | 30 |
| 5 | PP-1 | 3 | 1.0 | 50 | 30 |

TABLE 3-continued

EXAMPLES ACCORDING TO THE INVENTION

| | Material | Thickness of base plate (mm) | Thickness of ribs (mm) | Cell Dimensions of Latticework | |
|---|---|---|---|---|---|
| | | | | L1 | L2 |
| 6 | PP-2 | 3 | 1.0 | 50 | 30 |
| 7 | PP-1 | 3 | 1.2 | 50 | 50 |
| 8 | PP-1 | 3 | 1.2 | 50 | 30 |
| 9 | PP-2 | 3 | 1.2 | 50 | 30 |
| 10 | PP-2 | 3 | 1.2 | 50 | 50 |

30 mm < L1 ≦ 50 mm
30 mm ≦ L2 ≦ 50 mm

TABLE 4

COMPARATIVE EXAMPLES

| | Material | Thickness of base plate (mm) | Thickness of ribs (mm) | Cell Dimensions of Latticework | |
|---|---|---|---|---|---|
| | | | | L1 | L2 |
| 1 | PP-1 | 3 | 0.6 | 30 | 30 |
| 2 | PP-4 | 3 | 0.6 | 30 | 30 |
| 3 | PP-3 | 3 | 0.6 | 30 | 30 |
| 4 | PP-5 | 3 | 0.6 | 30 | 30 |
| 5 | PP-2 | 3 | 0.8 | 30 | 30 |
| 6 | PP-1 | 3 | 0.8 | 30 | 30 |
| 7 | PP-5 | 3 | 0.8 | 40 | 30 |
| 8 | PP-5 | 3 | 0.8 | 50 | 30 |
| 9 | PP-2 | 1.5 | 0.8 | 40 | 30 |
| 10 | PP-2 | 3 | 0.4 | 30 | 30 |

The twenty specimens of shock absorbing structures (Examples 1–10 and Comparative Examples 1–10) thus obtained were evaluated in terms of formability during injection molding, in the manner as described below, and were also evaluated in terms of the shock absorbing capability, in the manner as described below. The results of the evaluation are indicated in TABLES 5 and 6.

Formability

In TABLES 5 and 6, "O" indicates that the shock absorbing structure was formed well under ordinary conditions, and "Δ" indicates that the structure could be formed, but required an excessively long molding time or a complicated mold with a complicated degassing mechanism, for example. "X" indicates that the mold was not fully filled with the resin material, and the shock absorbing structure could not be formed.

Shock Absorbing Capability

Each specimen of the shock absorbing structure was vertically fixed, and an impactor (having a mass of 20 kg) of an impact tester was dropped against the structure at a rate of 6 m/s, to observe a load-displacement relationship of the specimen. In TABLES 5 and 6, "O" indicates that the impact displacement was at least 80%, and the load value was kept substantially constant within the range of 2 kN, and "X" indicates that the impact displacement was less than 80%, and/or the load value was outside the predetermined range.

TABLE 5

| Examples of the Invention | Formability | Shock Absorption |
|---|---|---|
| 1 | O | O |
| 2 | Δ | O |
| 3 | O | O |
| 4 | O | O |
| 5 | O | O |
| 6 | O | O |
| 7 | O | O |
| 8 | O | O |
| 9 | O | O |
| 10 | O | O |

TABLE 6

| Comparative Examples | Formability | Shock Absorption |
|---|---|---|
| 1 | Δ | O |
| 2 | Δ | X |
| 3 | Δ | O |
| 4 | Δ | X |
| 5 | Δ | X |
| 6 | O | X |
| 7 | O | X |
| 8 | O | X |
| 9 | O | X |
| 10 | X | — |

It will be apparent from TABLES 5 and 6 that Examples 1–10 constructed according to the present invention were excellent in terms of both formability and shock absorbing capability. On the other hand, Comparative Examples 2, 4, 7 and 8 formed of either of PP-4 and PP-5 having the properties outside the ranges of the present invention exhibited poor shock absorbing capability, and Comparative Examples 1, 3, 5 and 6 having relatively small cell dimensions of the latticework of ribs exhibited inferior formability and shock absorbing capability. Comparative Example 9 having a base plate whose thickness was outside the range of the present invention exhibited poor shock absorbing capability, and Comparative Example 10 having ribs whose wall thickness was outside the range of the present invention could not be formed by injection molding. It was confirmed from the above results that only the shock absorbing structures constructed according to the present invention exhibited both excellent shock absorbing capability and excellent formability.

The above-described facts can be clearly recognized from the graphs of FIGS. 8–11 which represent respective load-displacement characteristics of Examples 1–4 according to the present invention.

Figure 14:
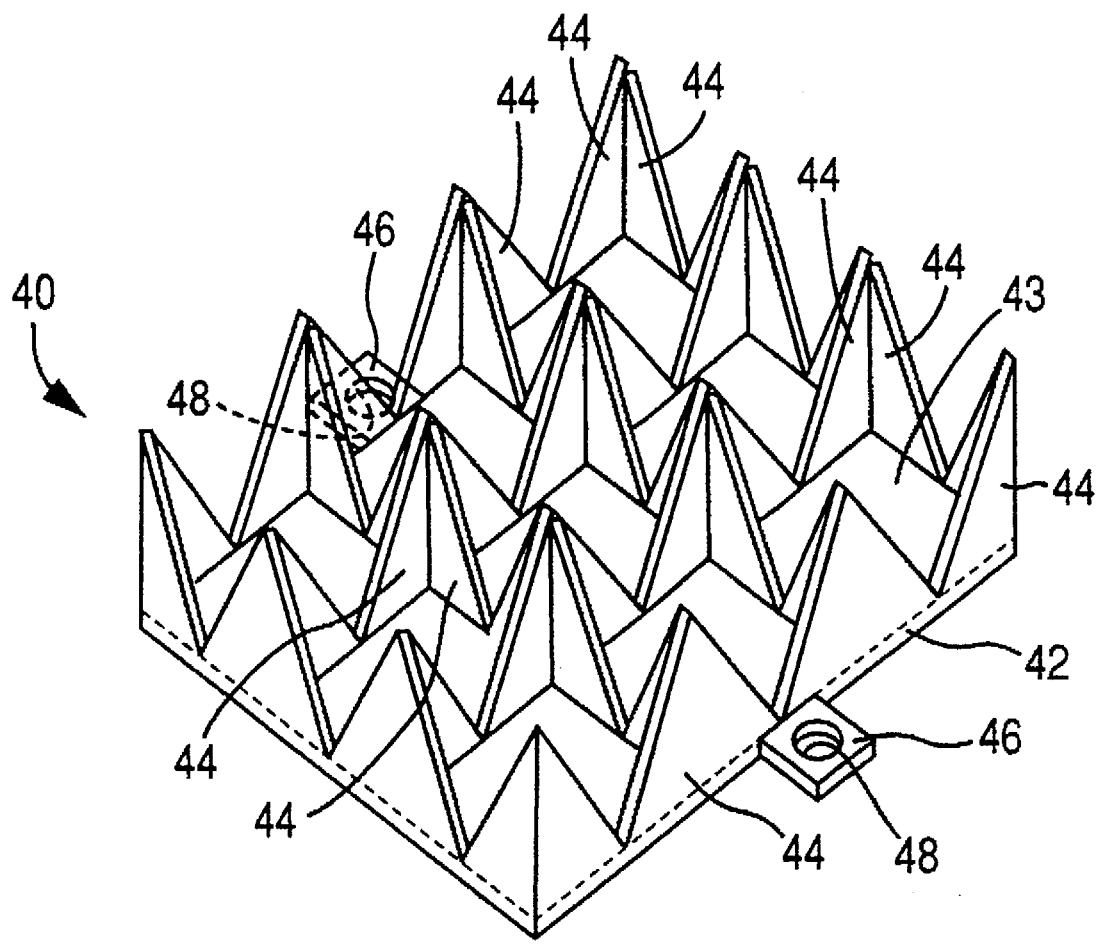
FIG. 14 is a perspective view showing a second embodiment of a shock absorbing structure for a motor vehicle of the present invention.
Figure 15:
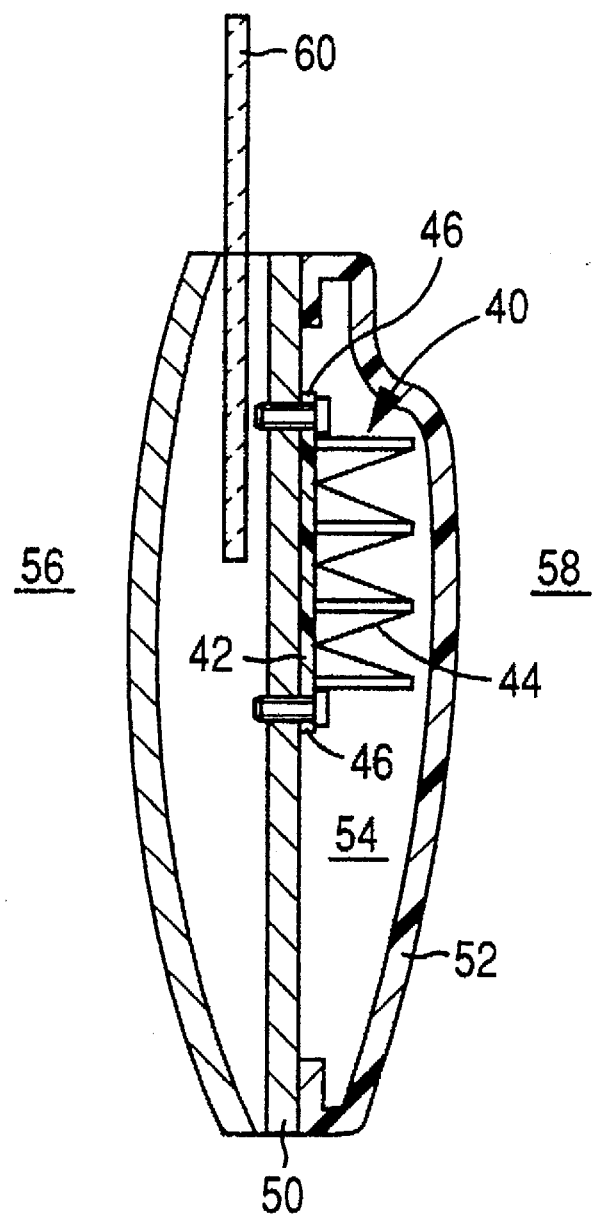
FIG. 15 is a side elevational view showing the shock absorbing structure of FIG. 14 when it is attached to the inside of a door panel of an automobile.

Referring next to FIGS. 14 and 15, there will be described in detail another embodiment of a shock absorbing structure for a motor vehicle of the present invention, which can be suitably installed on a door panel or a quarter panel of an automobile. As shown in FIG. 14, the shock absorbing structure 40 includes a base plate 42, and a plurality of ribs 44 formed integrally on an upper surface 43 of the base plate 42.

Described in detail, the base plate 42 of the shock absorbing structure 40 is formed of a suitable synthetic resin material, and has a rectangular, flat shape. A pair of ears 46, 46 are formed integrally on the widthwise opposite side faces of the base plate 42, such that the ears 46, 46 protrude a suitable distance from the respective side faces. These ears 46, 46 have respective holes 48, 48 through which bolts are inserted to attach the shock absorbing structure 40 to the inside of a door panel or the rear side of a quarter panel, for example.

Each of the ribs 44 is formed of a synthetic resin material having relatively high flexibility, and consists of a thin, flat triangular plate. The flexible ribs 44 are arranged on the upper surface 43 of the base plate 42, in four parallel longitudinal rows parallel to one pair of opposite sides of the rectangle of the base plate 42, and in four parallel transverse rows parallel to the other pair of opposite sides of the rectangle. The four longitudinal rows are spaced apart from each other in the transverse direction of the base plate 42, while the four transverse rows are spaced apart from each other in the longitudinal direction of the base plate 42. The two outermost longitudinal rows are disposed along and adjacent to the longitudinal side edges of the base plate 42, while the two outermost transverse rows are disposed along and adjacent to the transverse side edges of the base plate 42.

Each of the longitudinal and transverse rows consists of the four triangular ribs 44. That is, a total of 16 ribs 44 are arranged in the four longitudinal rows, while a total of 16 ribs 44 are arranged in the four transverse rows. The ribs 44 are formed on the base plate 42 such that the 16 ribs 44 lie in longitudinal parallel planes perpendicular to the upper surface 43 and parallel to the longitudinal sides of the rectangle of the base plate 42, and the 16 ribs 44 lie in transverse parallel planes which are perpendicular to the longitudinal parallel planes and the upper surface 43 and parallel to the transverse sides of the rectangle of the base plate 42. Thus, the ribs 44 lie in a plurality of parallel planes which includes planes that intersect with each other.

Each triangular rib 44 has a base on the upper surface 43 of the base plate 42, and an apex remote from the upper surface 43. The two triangular ribs 44 at the opposite ends of each longitudinal row and the two triangular ribs 44 at the opposite ends of each transverse row have a smaller dimension at their base. More precisely, the dimension of the base of those triangular ribs 44 at each end of the longitudinal and transverse rows is equal to a half of that of the other triangular ribs 44. At each of the four corners of the rectangle of the base plate 42, the two triangular ribs 44 with the reduced base dimension are connected so as to form an L shape as seen in the direction perpendicular to the plane of the upper surface 43 of the base plate. The two ribs 44 with the normal base dimension in each of the two outermost longitudinal rows are connected to the respective two ribs 44 with the reduced base dimension at the opposite ends of the two inner transverse rows, such that the two ribs 44 form a T shape as seen in the above-identified direction. Similarly, the two ribs 44 with the normal base dimension in each of the two outermost transverse rows are connected to the respective two ribs 44 with the reduced base dimension at the opposite ends of the two inner longitudinal rows, such that the two ribs 44 form a T shape. The four inner ribs 44 in the inner two longitudinal rows are connected to the respective four inner ribs 44 in the inner two transverse rows, such that the corresponding two ribs 44 which are in the longitudinal and transverse rows, respectively, are crisscrossed so as to form a "+" or X shape. Thus, the four longitudinal rows of the ribs 44 cooperate with the four transverse rows of the ribs 44 to constitute a matrix of flexible ribs.

The thus constructed shock absorbing structure 40 is fixedly attached to the inside of a door panel or the rear side of a quarter panel, for example, by means of bolts or the like. Upon installation of the structure 40, the base plate 42 is advantageously located on the outer side of the interior of the automobile, while the apexes of the ribs 44 are directed toward the interior. That is, when the shock absorbing structure 40 is attached to the inside of the door panel, the structure 40 is desirably disposed in a space 54 formed between a door body 50 in the form of an iron plate, and a door trim 52 formed of a synthetic resin, as shown in FIG. 6, such that the base plate 42 is located on the side of the exterior 56 of the vehicle, and the ribs 44 are located on the side of the interior 58 of the vehicle. The base plate 42 is fixed at the ears 46, 46 to the door body 50 by means of bolts or the like, so that the structure 40 is fixedly attached to the door panel. In this arrangement, the present shock absorbing structure 40 exhibits a desired load-displacement characteristic when an impact force is applied to the structure 40 in the direction perpendicular to the upper surface 43 of the base plate 42. In FIG. 15, reference numeral 60 denotes a window pane of the door.

In the shock absorbing structure 40 according to the present embodiment, each flexible rib 44 has a triangular shape, and the width which gradually decreases toward its upper end or apex, as described above. When a load is applied to the rib 44 in the direction perpendicular to the upper surface 43 of the base plate 42, therefore, the upper end portion of each rib 44 is more likely to be deflected, displaced or otherwise deformed, than the lower end portion. Namely, the amount of deflection or deformation of the rib 44 increases with an increase of the impact force which acts on the rib 44. In other words, when the impact force is relatively small, only the relatively upper portion of the rib 44 is deflected or deformed when the impact force is relatively small, and the length and amount of the deflection or deformation of the rib 44 increase as the impact force increases.

The ribs 44 are formed on the upper surface 43 of the base plate 42, such that the ribs 44 lie in the four longitudinal planes and four transverse planes which intersect each other at right angles. In this arrangement, when an impact force is applied to the structure 40 in the longitudinal direction of the base plate 42 or a direction close to that direction, the impact force is effectively absorbed by the ribs 44 which are arranged in the longitudinal rows. When the impact force is applied in the transverse direction of the base plate 42 or a direction close to that direction, the impact force is effectively absorbed by the ribs 44 which are arranged in the transverse rows.

Figure 22A:
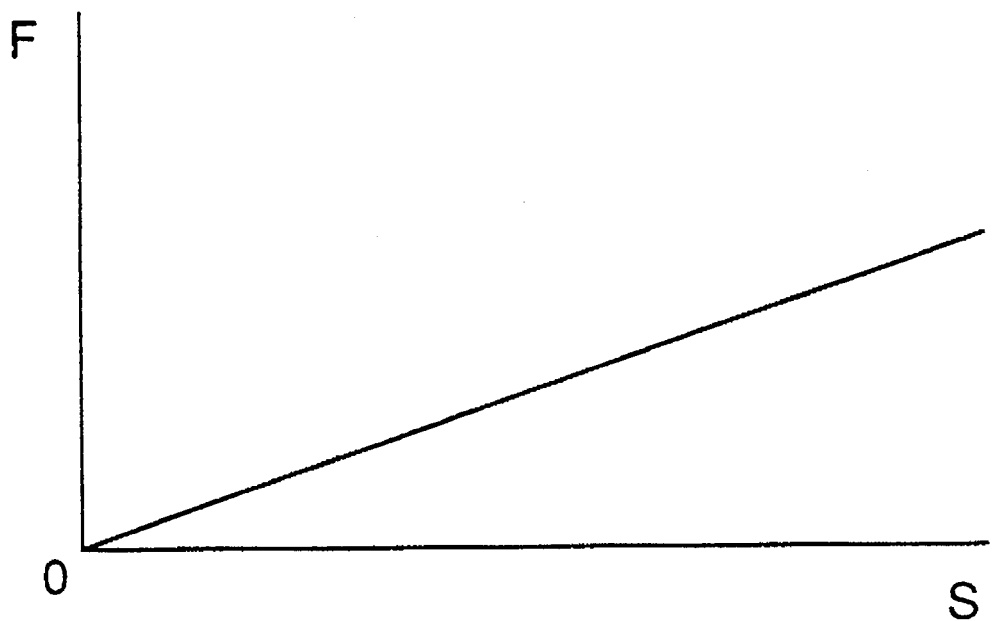
FIG. 22A is a graph indicating a load-displacement relationship of the shock absorbing structure of the second embodiment of the present invention.
Figure 22B:
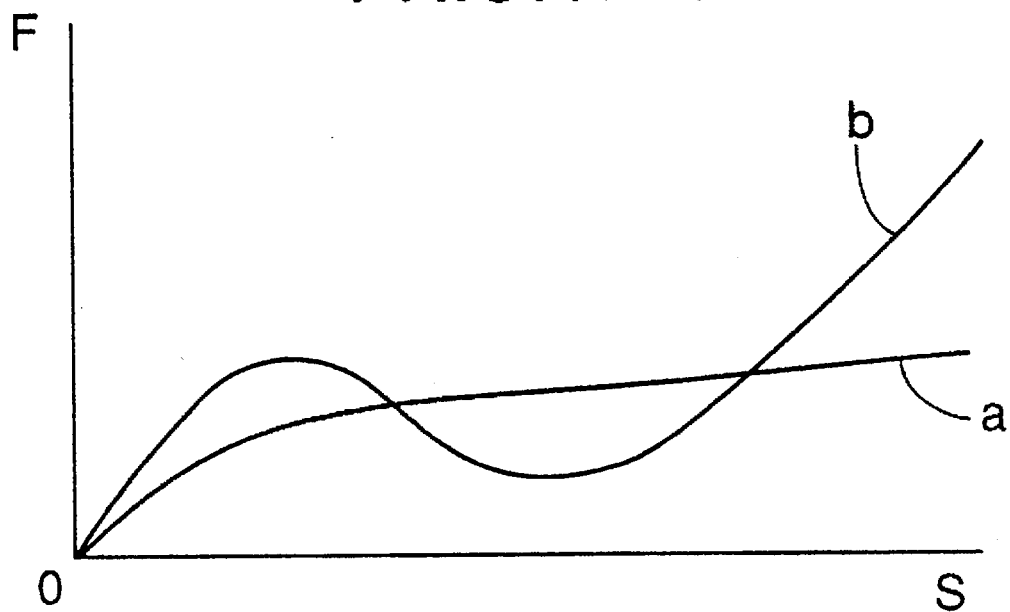
FIG. 22B is a graph indicating load-displacement relationships of conventional shock absorbing structures.
Figure 23:
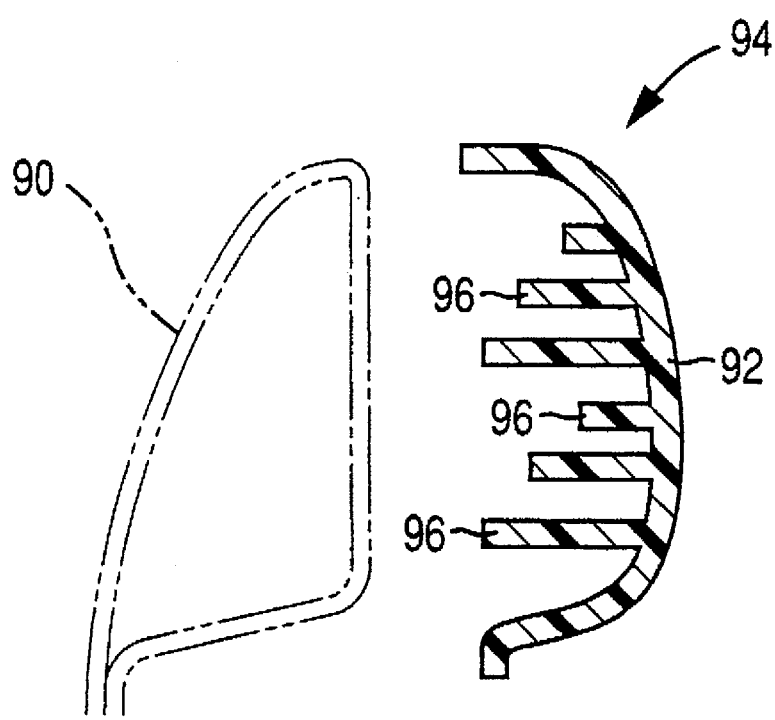
FIG. 23 is a cross sectional view of a conventional shock absorbing structure.

In the shock absorbing structure 40 of the instant embodiment as described above, the initial load value is relatively small, namely, the ribs 44 are deflected or deformed so as to absorb an impact energy even when the applied impact force is relatively small. Further, the load value linearly increases with an increase of the amount of displacement. That is, the present structure 40 exhibits a load-displacement characteristic or relationship as indicated in the graph of FIG. 22A. Further, the present structure 40 does not suffer from a considerable variation in its shock absorbing capability due to a change in the direction in which the impact force is applied to the structure 40. Thus, the shock absorbing structure 40 is advantageously installed in a relatively small space, such as the inside of a door panel or the rear side of a quarter panel, thereby to effectively and stably absorb an impact energy when the door panel or quarter panel hits a vehicle passenger, more particularly, pelvic and breast parts of the passenger's body.

In the shock absorbing structure 40 as described above, the same number of ribs 44 are provided in each of the longitudinal and transverse rows on the upper surface 43 of the base plate 42. This advantageously reduces or eliminates a difference in the amount of the impact energy that can be absorbed on the basis of deflection or deformation of the ribs 44, when the impact force is applied to the structure 40 in the two different directions, namely, in the longitudinal and transverse directions of the base plate 42.

In the above shock absorbing structure 40, the base plate 42 is provided with the ears 46, 46, through which the structure 40 is attached to or assembled with a door panel, door trim, or a quarter panel, for example, by means of bolts or the like. This eliminates a need to bond the structure 40 to such a vehicle component, with an adhesive applied to the entire surface area of the base plate 42 which faces the component, thus assuring improved efficiency in installing the structure 40 on the vehicle component.

Further, in the above shock absorbing structure 40, the ribs 44 are formed on the upper surface 42 of the base plate 43 such that the ribs 44 in the longitudinal rows are connected to the ribs 44 in the transverse rows such that the two ribs 44 in the longitudinal and transverse rows intersect or abut on each other at right angles so as to form a matrix of ribs. In this arrangement, a relatively large number of ribs 44 can be provided per unit area of the base plate 42, whereby the shock absorbing characteristic of the structure 40 is less likely to vary depending upon the direction in which the impact force is applied to the structure 40, resulting in a substantially constant amount of absorption of the impact energy by the structure 40.

Referring next to FIGS. 16–21, there will be described further embodiments which are similar to the second embodiment of FIG. 14 described just above.

Figure 16:
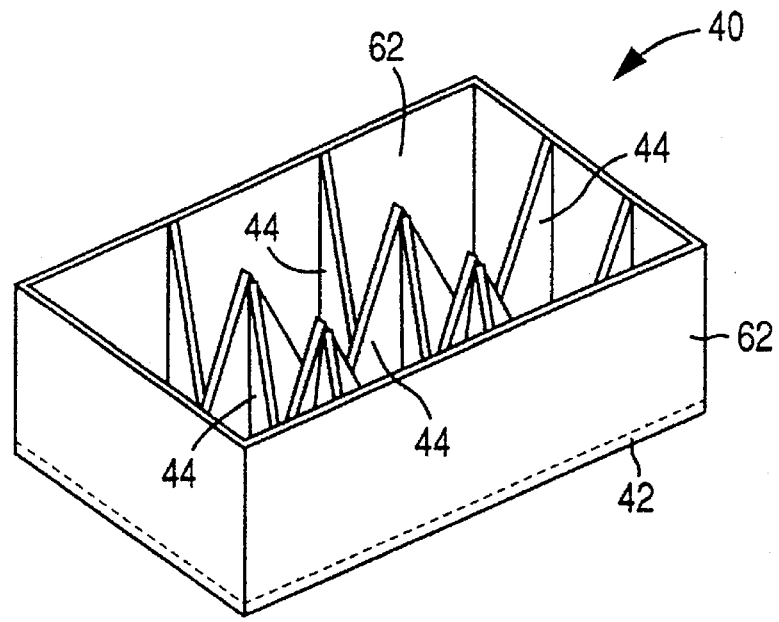
FIG. 16 is a perspective view showing a third embodiment of a vehicle shock absorbing structure of the present invention.

While all of the ribs 44 have a triangular shape in the second embodiment, part of the ribs 44 may not have a triangular shape, depending upon the load-displacement characteristic required of the shock absorbing structure 40. For instance, the shock absorbing structure 10 may include rectangular ribs 62 formed along the four sides of the rectangle of the base plate 42, as shown in FIG. 16, in addition to the triangular ribs 44 formed inside a rectangular frame defined by the four rectangular ribs 62. In this third embodiment, the structure 40 exhibits a linear load-displacement relationship wherein the F/S ratio is larger than that indicated by the load-displacement relationship line indicated in FIG. 22A. Consequently, this structure 40 is able to absorb a larger amount of impact energy per unit amount of displacement thereof.

Figure 17:
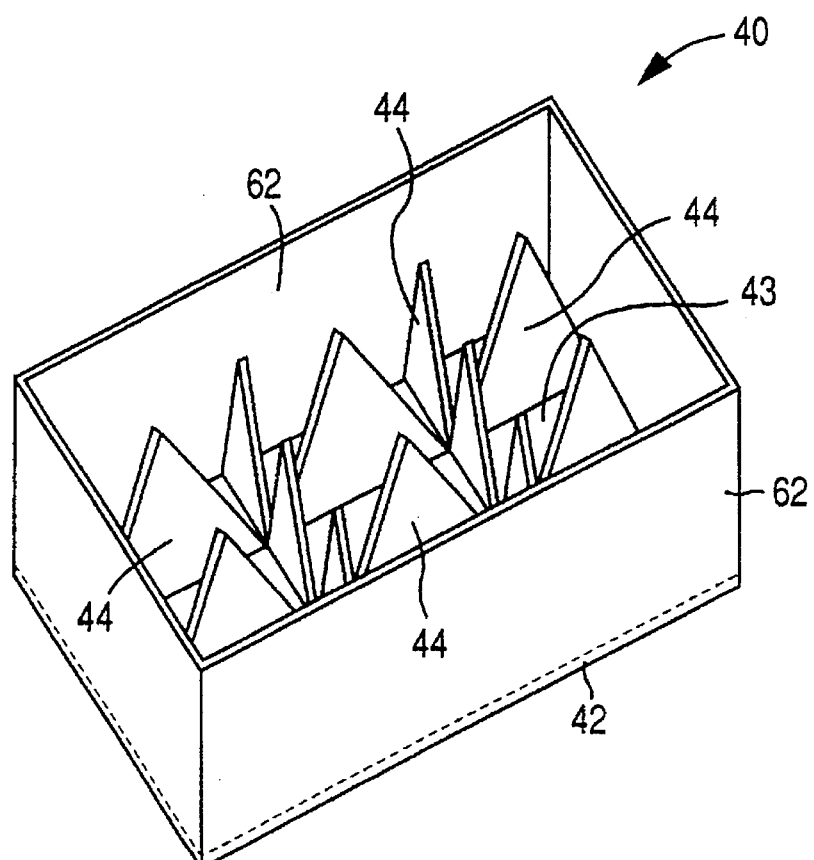
FIG. 17 is a perspective view showing a fourth embodiment of a vehicle shock absorbing structure of the present invention.
Figure 18:
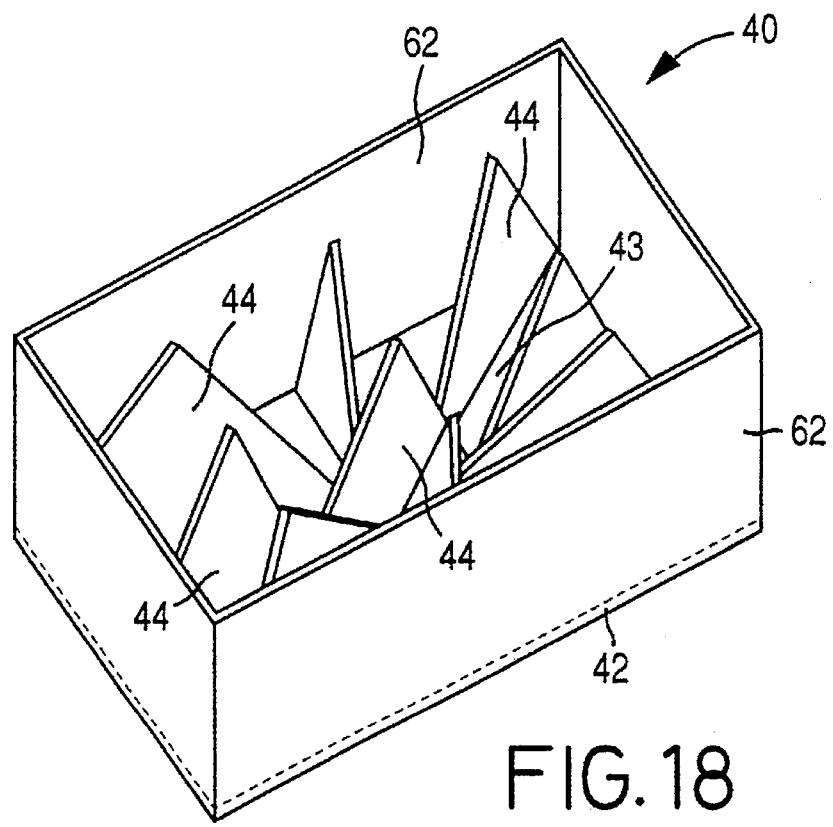
FIG. 18 is a perspective view showing a fifth embodiment of a vehicle shock absorbing structure of the present invention.
Figure 19:
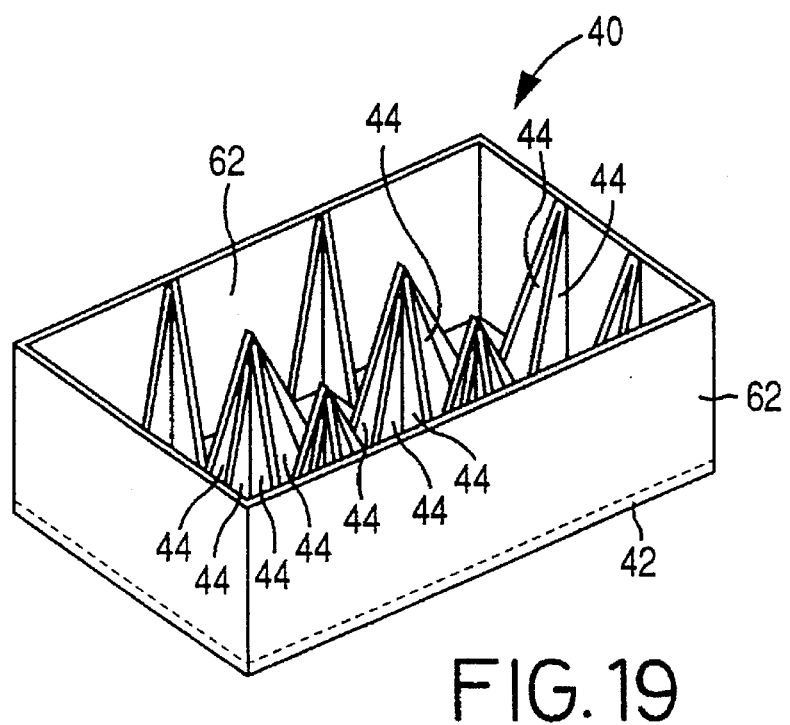
FIG. 19 is a perspective view showing a sixth embodiment of a vehicle shock absorbing structure of the present invention.

In the second embodiment of FIG. 14, the two ribs 44 one of which lies in a longitudinal plane and the other of which lies in a transverse plane perpendicular to the longitudinal plane intersect or abut on each other at right angles. However, the position and arrangement of the ribs 44 are not limited to those of the second embodiment. For example, the triangular ribs 44 may be disposed independently of each other within the rectangular frame of the rectangular ribs 62, as shown in FIG. 17. In this fourth, the triangular ribs 44 are arranged in two longitudinal rows and in two transverse rows on the surface 43 of the base plate 42, without intersection or mutual abutment of the two triangular ribs 44 in the respective longitudinal and transverse rows. In an alternative fifth embodiment of the invention, the triangular ribs 44 may be arranged so as to extend in a radial direction such that the one end of each radial triangular rib 44 is located in a central part of the surface 43 and the other end is located near the periphery of the rectangle of the base plate 42, as shown in FIG. 18. In a still further sixth embodiment of the invention, three or more triangular ribs 44 may intersect or abut on one another at each of the intersections of the longitudinal and transverse rows. For instance, a plurality of ribs 44 may extend radially from each of the intersections of the planes, as shown in FIG. 19, such that these ribs 44 form one apex at each intersection.

It is to be understood that the number of the ribs 44 is not limited to those of the above embodiments, but may be suitably determined depending upon the shape and structure of the vehicle component on which the shock absorbing structure is installed, and so as to obtain a desired load-displacement characteristic of the structure.

Figure 20:
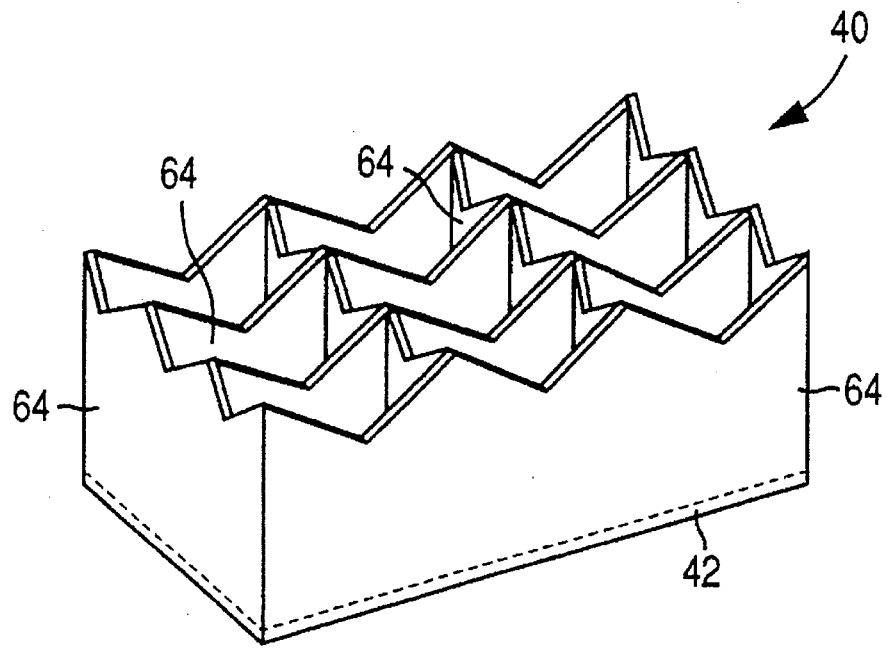
FIG. 20 is a perspective view showing a seventh embodiment of a vehicle shock absorbing structure of the present invention.
Figure 21:
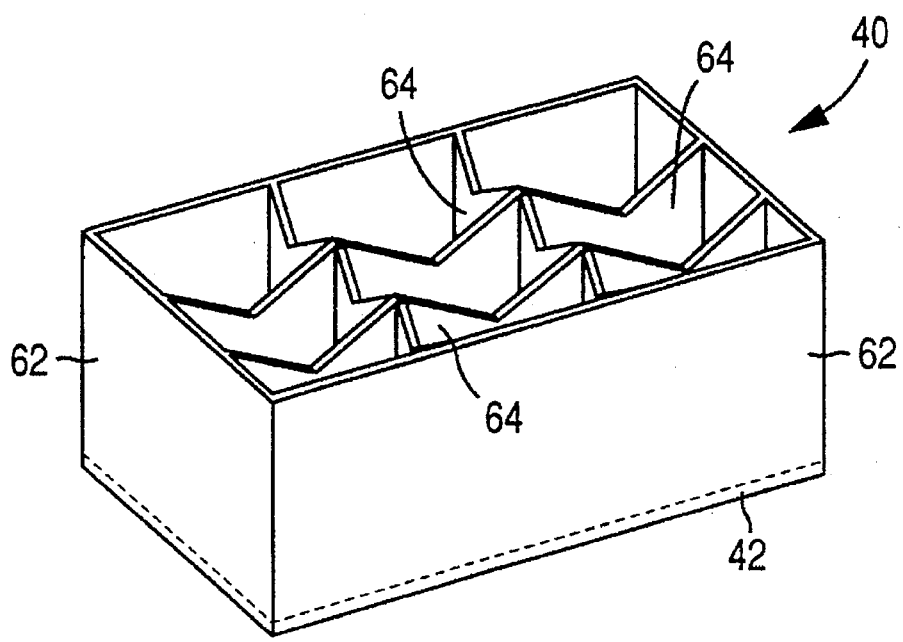
FIG. 21 is a perspective view showing an eighth embodiment of a vehicle shock absorbing structure of the present invention.

It is also to be understood that the shape of the rib 44 is not limited to those of the above embodiments, but may be determined as desired, provided the dimension of at least the upper end portion of the rib 44 as measured in a plane parallel to the base plate 43 gradually decreases in the direction from the bottom toward the upper end thereof. For example, the shock absorbing structure 40 may have parallel longitudinal and transverse planar ribs 64 which intersect each other, as indicated in FIG. 20. In this seventh embodiment, each planar rib 64 has a sawtoothed upper end portion having a plurality of successive triangular teeth. The dimension of each triangular tooth as measured in the longitudinal or transverse direction gradually decreases in the direction from the base toward the apex, like the triangular rib 44. In this arrangement, the height of the triangular tooth is preferably at least 30% of the maximum height of the planar rib 64 (height from the upper surface of the base plate 42 to the apex of each triangular tooth). It is also possible to provide a rectangular frame consisting of the rectangular ribs 62 along the outer periphery of the base plate 42, as well as the planar ribs 64 as described above, as shown in FIG. 21. In this eighth embodiment, the planar ribs 64 are disposed within the rectangular frame 62. Further, the shape of the shock absorbing structure 40 itself, that is, the shapes of the base plate and ribs, may be determined depending upon the vehicle component on which the structure 40 is installed, as long as the structure 40 includes the ribs 44 or 64 having the shapes as described above.

In the second embodiment as shown in FIG. 14, the base plate 42 is formed with the ears 46, 46 for attaching the shock absorbing structure 40 with bolts to a desired vehicle component. However, instead of providing the ears 46, 46, the structure 40 may be bonded to the desired vehicle component, with a suitable adhesive applied to the lower surface of the base plate 42 opposite to the upper surface 43 on which the ribs 44 are formed.

The thickness of the base plate 42 is preferably controlled to be at least 2 mm, so as to permit adequate control of the fracturing rate of the plate 42 and ribs 44, 64 upon collision of the structure 40, and thus assure highly stable shock absorbing capability. If the thickness of the base plate 42 is too large, the molding cycle for forming the plate 42 is prolonged, and the ribs 44 are deformed due to a shrinkage difference between the ribs 44 and the plate 42 when cooled in the process of molding. Consequently, the shock absorbing structure 40 cannot absorb the impact energy with high stability. Thus, the thickness of the base plate 42 is desirably controlled to be not greater than 5 mm.

The wall thickness of the ribs 44 is not particularly limited but may be determined as desired depending upon the material of the ribs 44, for example. Preferably, the thickness of the ribs 44 is in the range of 0.6 to 1.2 mm. If the thickness is below 0.6 mm, that is, if the ribs 44 are too thin, it may become difficult to mold or form the ribs 44, resulting in reduced production efficiency of the shock absorbing structure 40. If the rib thickness exceeds 1.2 mm, that is, if the ribs 44 are too thick, on the other hand, the amount of deflection of the ribs 44 may be undesirably reduced, and the structure 40 may not be able to absorb the impact energy with sufficiently high efficiency.

While the height of the ribs 44 may be suitably determined depending upon an installation space for the shock absorbing structure 40, for example, it is desirable to form the ribs 44 with a height as large as possible so as to provide a sufficiently large impact displacement.

The shock absorbing structure 40 including the ribs 44 and the base plate 42 may be formed of any synthetic resin material. Preferably, the structure 40 is formed of a polyolefin resin having high ductility, or a polyamide resin. The polyolefin resin material may be selected from polypropylene, polyethylene, and polymer alloys thereof. Among these materials, the synthetic resin for the structure 40 desirably has a tangent modulus of elasticity of not greater than 10000 kg/cm$^2$, as measured in a bending strength test conducted according to ASTM D 790. Preferably, the shock absorbing structure 10 is formed by injection molding, using the above synthetic resin material. To the synthetic resin material, there may be added in suitable proportions a rubber material such as an ethylene-propylene-diene copolymer, an ethylene-propylene rubber, a filler such as talc, mica, calcium carbonate, glass fiber, or wollastonite, and other additives such as hindered amine or BHT, for example. The addition of these additives provides the shock absorbing structure 10 with improved properties, as described above with respect to the shock absorbing structure 10 according to the first embodiment of FIGS. 1–3.

While the shock absorbing structure 40 according to the second through eighth embodiments of FIGS. 14 and 16–21 of the present invention is attached to a door panel or quarter panel of an automobile, the principle of the invention is also applicable to shock absorbing structures to be installed on other vehicle components, such as a pillar garnish, door grab, instrument panel, and cluster.

Referring next to FIG. 24 through FIG. 27, there will be hereinafter described a ninth embodiment of the present invention in the form of a shock absorbing structure 70 for a motor vehicle, which is to be attached to the inside of a door panel of an automobile. The shock absorbing structure 70 is a generally rectangular box-like construction, and includes a rectangular base plate 72, a plurality of first ribs 74 formed on one of the opposite major surfaces of the base plate 72, and a plurality of second ribs 76 formed on the other major surface of the plate 72. These first and second ribs 74, 76 are arranged so as to form respective first and second latticeworks or honeycomb bodies integral with the base plate 72.

Figure 24:
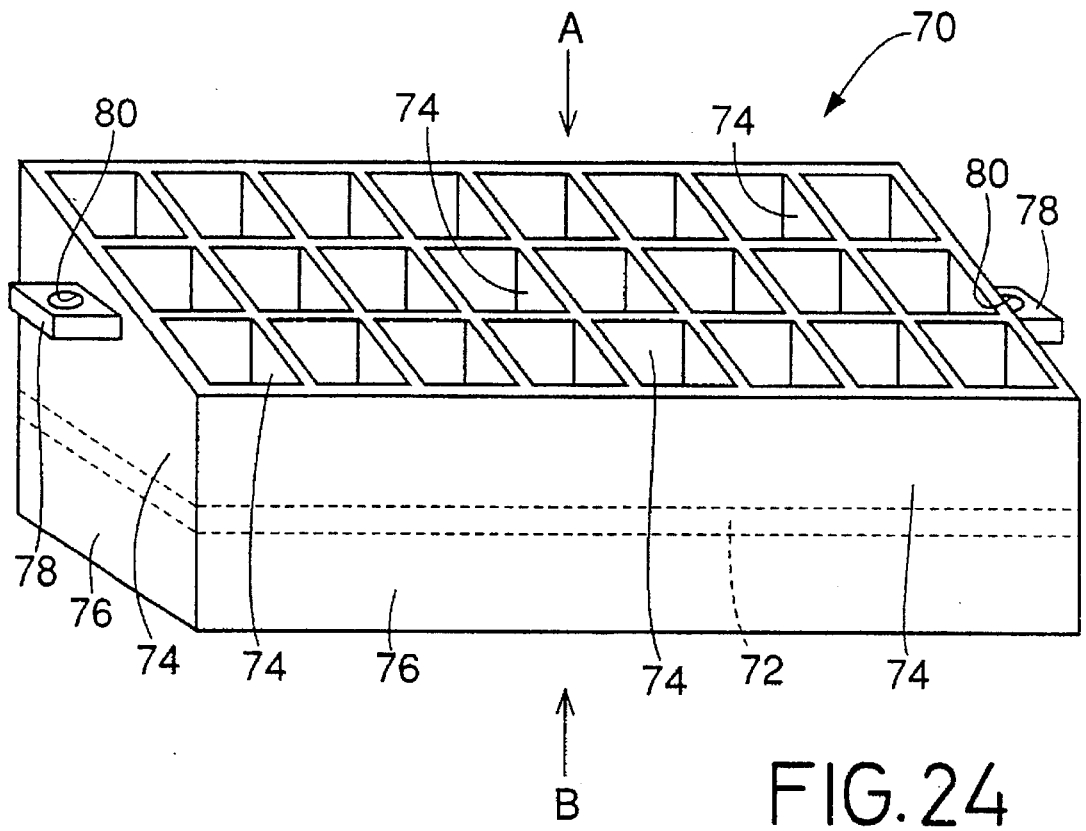
FIG. 24 is a perspective view showing a ninth embodiment of a vehicle shock absorbing structure of the present invention.
Figure 25:
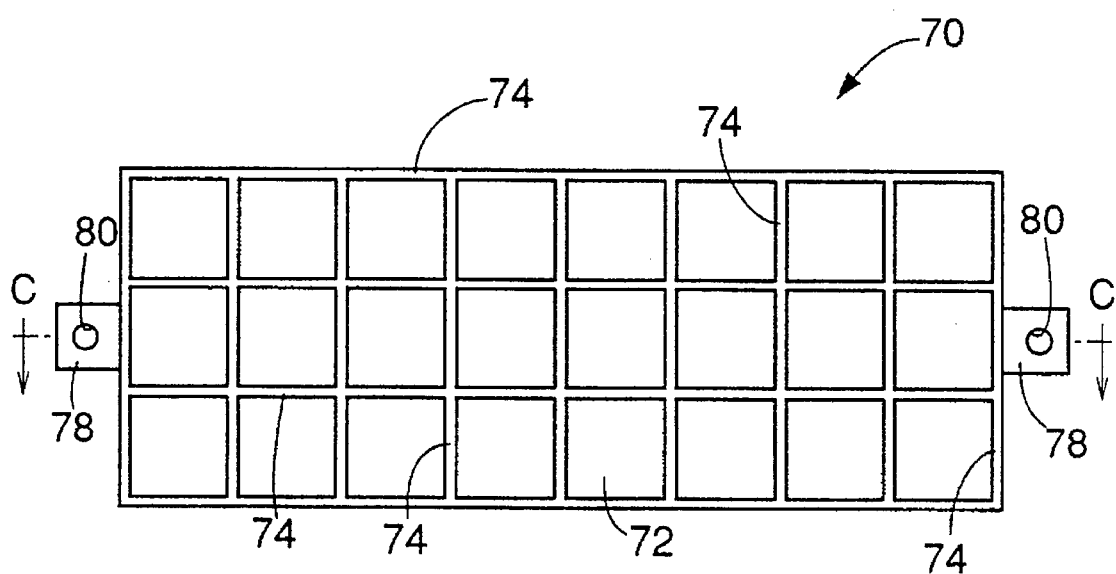
FIG. 25 is a top plan view as seen in the direction of arrow "A" in FIG. 24.

The base plate 72 of the shock absorbing structure 70 is formed of a suitable synthetic resin material, and has a suitable thickness. Each first rib 74 is a generally rectangular plate with a considerably small wall thickness. As shown in FIGS. 24 and 25, the first latticework formed by the first ribs consists of four longitudinal ribs extending in the longitudinal direction of the base plate 72, and nine transverse ribs which extend in the transverse direction of the base plate 72 and intersect the longitudinal ribs at right angles. The longitudinal ribs are equally spaced from each other in the transverse direction while the transverse ribs are equally spaced from each other in the longitudinal direction. The four longitudinal ribs have different height dimensions as measured from the corresponding major surface of the base plate 72. The height dimensions of these longitudinal ribs increase in steps in the transverse direction. Each of the nine transverse ribs has a continuously varying height dimension. That is, the height dimension of each transverse rib varies continuously from the smallest height dimension to the largest height dimension of the longitudinal ribs. Thus, the first latticework consisting of the first ribs 74 (mutually intersecting longitudinal and transverse plates or ribs) has a configuration which corresponds to a space within the door panel in which the present shock absorbing structure 70 is installed.

In the latticework of the first ribs 74, a pair of mounting ears 78, 78 are formed integrally with the outer surfaces of the two outermost transverse ribs of first ribs 74 at the opposite longitudinal ends the base plate 72, such that the ears 78 protrude outwardly from the respective outer surfaces by a suitable distance. The mounting ears 78, 78 have respective holes 80, 80 through which appropriate bolts are inserted for attaching the shock absorbing structure 70 to the inside of the door panel.

Figure 26:
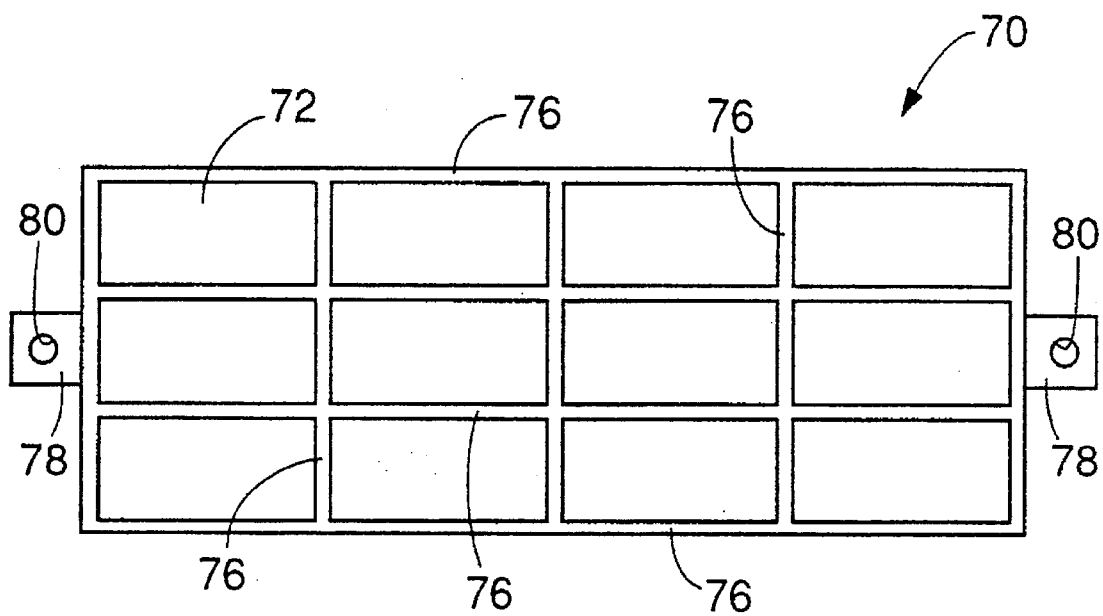
FIG. 26 is a bottom plan view as seen in the direction of arrow "B" in FIG. 24.

Each of the second ribs 76 is also a rectangular plate with a relatively small thickness, as shown in FIG. 26. The second latticework formed by the second ribs 76 consists of four longitudinal ribs and five transverse ribs which intersect the longitudinal ribs at right angles. Unlike the first ribs 74, all of second ribs 76 (longitudinal and transverse) have the same height dimension. Thus, the second latticework consisting of the second ribs 76 (mutually intersecting longitudinal and transverse plates or ribs) is provided on the surface of the base plate 72 opposite to the surface on which the first latticework is provided.

In the shock absorbing structure 70 of the present ninth embodiment, the first ribs 74 and the second ribs 76 are formed on the respective opposite major surfaces of the base plate 72, such that the ribs 74, 76 and the plate 72 constitute an integrally formed body.

Figure 27:
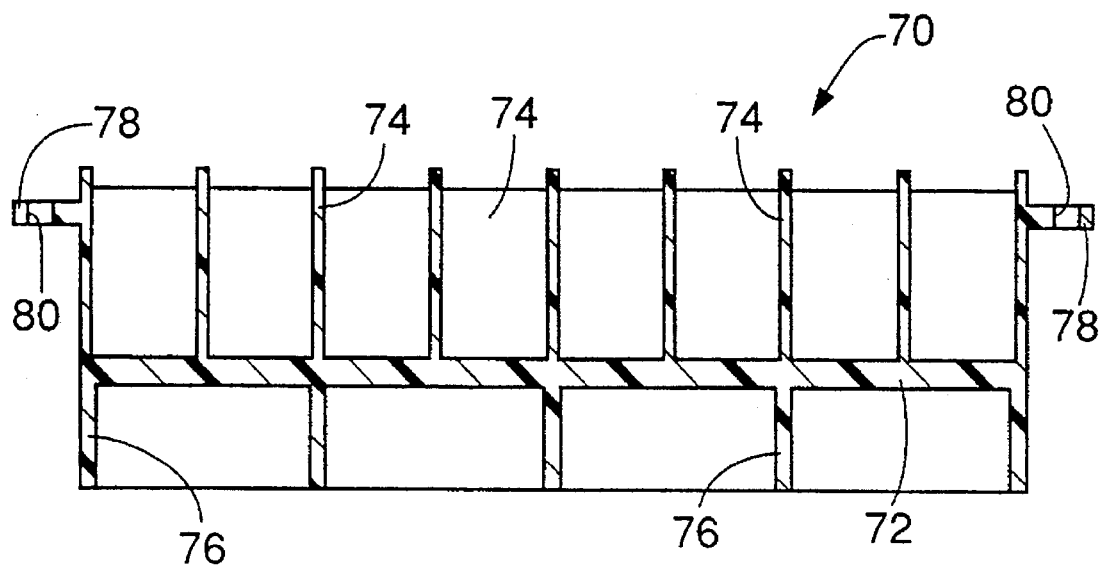
FIG. 27 is a cross sectional view taken along line 27—27 in FIG. 25.

As is apparent from FIGS. 25–27, the rectangular cells formed in the first latticework of first ribs 74 are different from those in the second latticework of second ribs 76, in the wall thickness, height dimension as seen in FIG. 27 and dimensions as seen in FIGS. 25 and 26.

More specifically, the wall thickness of the second ribs 76 is greater than that of the first ribs 74, and the height dimension of the second ribs 76 as measured from the base plate 72 is smaller than those of the first ribs 74, as indicated in FIG. 27. Further, the dimension of each cell of the second latticework of second ribs 76 as measured in the longitudinal direction of the base plate 72 is greater than that of the first ribs 74.

Since the wall thickness of the second ribs 76 is larger than that of the first ribs 74, the second ribs 76 have a greater fracture strength, than the first ribs 74. On the other hand, since the second latticework of second ribs 76 has a smaller number of rectangular cells each having a larger longitudinal dimension than the first latticework 74, the fracture strength of the second latticework 76 as a whole is suitably tuned with respect to the first latticework of first ribs 74. Further, the height of the second ribs 76 from the base plate 72 is smaller than that of the first ribs 74, in other words, the height of the first ribs 74 is greater than that of the second ribs 76, so that the first ribs 74 have a larger impact displacement upon application of the same impact force to the first and second latticeworks of first and second ribs 74, 76.

When a certain impact force due to collision of the motor vehicle is applied to the shock absorbing structure 70 constructed as described above, therefore, only the first ribs 74 are fractured and the second ribs 76 maintain their original shape, while the load acting on the structure 70 is smaller than a predetermined level. After the load exceeds the predetermined level, the second ribs 76 as well as the first ribs 74 begin to be fractured. In the process of fracture of these ribs 74, 76, the shock absorbing structure 70 is able to effectively absorb the impact energy in the initial process of fracture of the structure 70, namely, during fracture of only the first ribs 74.

There will be hereinafter described one preferred method of producing the shock absorbing structure 70 in which the fracture strength of the second ribs 76 is tuned so that only the first ribs 74 are first fractured, and then the second ribs 76 are fractured.

Initially, an integral assembly consisting of the base plate 72 and the first and second latticeworks is formed by injection or compression molding, as an intermediate product. However, the second latticework of this intermediate product is different from that of the final shock absorbing structure 70. That is, the first latticework consisting of the first ribs 74 each having a relatively small thickness is formed on one major surface of the base plate 72, such that the first latticework has the rectangular cells with predetermined dimensions. At the same time, the second latticework consisting of the second ribs 76 having a larger thickness than the first ribs 74 is formed on the other major surface of the base plate 72, such that the rectangular cells of the second latticework of second ribs 76 have the same dimensions as those of the first latticework of first ribs 74. That is, the second latticework of second ribs 76 of the intermediate integral assembly has the same number of transverse ribs (nine transverse ribs) as the first latticework of first ribs 74. In this respect, the second latticework of second ribs 76 of the intermediate product is different from that of the final product 70.

Then, the intermediate integral assembly is further processed such that the second, fourth, sixth and eighth transverse ribs of second ribs 76 of the second latticework are removed, to obtain the second latticework as shown in FIG. 26 which has the five transverse, ribs. In the thus produced shock absorbing structure 70, the second latticework of second ribs 76 having the larger wall thickness and smaller height dimension has a greater fracture strength than that of the first latticework of first ribs 74. The obtained structure 70 is attached to a mounting portion provided within a door panel of an automobile. Usually, the first latticework of the ribs 74 is located on the side of the interior of the automobile (faces a vehicle driver or passenger).

In the instant shock absorbing structure 70 in which the first ribs 74 and the second ribs 76 are formed integrally on the opposite surfaces of the base plate 72, respectively, the total height of the first and second latticeworks of first and second ribs 74, 76 can be easily increased to a desired level without significantly increasing the height of the individual ribs. That is, the total height of the ribs 74, 76, which is a sum of the heights of the first and second latticeworks, can be made relatively large by relatively small amounts of increase in the heights of the first ribs 74 and second ribs 76. Accordingly, the first and second ribs 74, 76 can be formed by a mold wherein the cavities for the ribs 74, 76 have relatively small depths. Therefore, the mold cavities can be easily filled with the resin material, and the ribs 74, 76 need not have a large draft angle to facilitate the removal of the formed structure 70 from the mold.

Accordingly, the present shock absorbing structure 70 can be produced with high formability, even if the total height of the ribs 74, 76 is considerably large. The large total height of the ribs 74, 76 assures a sufficient impact displacement of the structure 70 and improved shock absorbing capability. The present shock absorbing structure 70 can be suitably used for a vehicle component, such as a door panel or quarter panel, which requires a shock absorber with high capability. Thus, the present structure 70 can effectively and easily absorb the impact energy upon collision of such door panel or quarter panel with a vehicle passenger, in particular, the pelvic part of the passenger's body.

In the shock absorbing structure 70 of the instant embodiment, the fracture strength of the second ribs 76 is made higher by a suitable degree than that of the first ribs 74. When an impact force is applied to the structure 70, therefore, only the first ribs 74 are fractured when the load acting on the structure 70 is smaller than a predetermined level, and the second ribs 76 begin to be fractured when the load exceeds the predetermined level. The shock absorbing characteristic of the shock absorbing structure 70 may be suitably tuned by adjusting a shock absorbing characteristic owing to the fracturing of the first ribs 74 in an initial stage of fracturing of the structure 70, and a shock absorbing characteristic owing to the fracturing of the second ribs 76 in a subsequent stage of fracturing of the structure 70.

In the shock absorbing structure 70, the second ribs 76 have larger thickness and smaller height dimension than the first ribs 74, and accordingly have a greater fracture strength, so that the second ribs 76 are fractured after the first ribs 74 are fractured. Thus, the first ribs 74 function to absorb an impact energy when the impact force applied thereto is relatively small, and the second ribs 76 function to absorb an impact energy when the impact force is relatively large.

Further, since the first ribs 74 and the second ribs 76 are formed so as to constitute the first and second latticeworks over the entire areas of the opposite surfaces of the base plate 72, the amounts of fracture or deformation of the first ribs 74 and the second ribs 76 do not considerably vary depending upon the direction in which an impact force is applied to the structure 70. Therefore, the amount of the impact energy absorbed by the structure 70 does not vary to a large extent depending upon the direction of input of the impact force.

The excellent characteristics of the present shock absorbing structure 70 will be more clearly understood from the following description of a test conducted by the inventors.

Initially, there were prepared two kinds of polyolefin resin materials which contain polypropylene as a major component and which have different degrees of hardness due to the use of different amounts or kinds of additives. Using each of these two kinds of the polyolefin resin materials, eight samples of shock absorbing structures 70 were formed by injection molding. Each sample has a general configuration as shown in FIG. 24, and includes the first latticework of the first ribs 74 as shown in FIG. 25 and the second latticework of the second ribs 76 having a selected one of different configurations as shown in FIGS. 28 through 31. Samples 1–4 were formed of one of the two polyolefin resin materials which has a relatively low hardness and includes the second latticework of second ribs 76 as shown in FIG. 28 through FIG. 31, respectively. Samples 5–8 were formed of the other polyolefin resin material which has a relatively high hardness and includes the second ribs 76 as shown in FIG. 28 through FIG. 31, respectively. Each of these samples has a length of 240 mm and a width of 80 mm, and the first ribs 74 of each sample have the largest height of 60 mm, the smallest height of 35 mm, and a wall thickness of 0.8 mm, while the second ribs 76 have a height of 30 mm and a wall thickness of 1.0 mm. The thickness of the base plate 72 of each sample is 3.0 mm.

Then, the shock absorbing characteristics (load-displacement relationships) of Samples 1 through 8 were measured in a known manner. The measured load-displacement relationships of Samples 1–8 are indicated in the graphs of FIG. 32 through FIG. 39, respectively.

Figure 28:
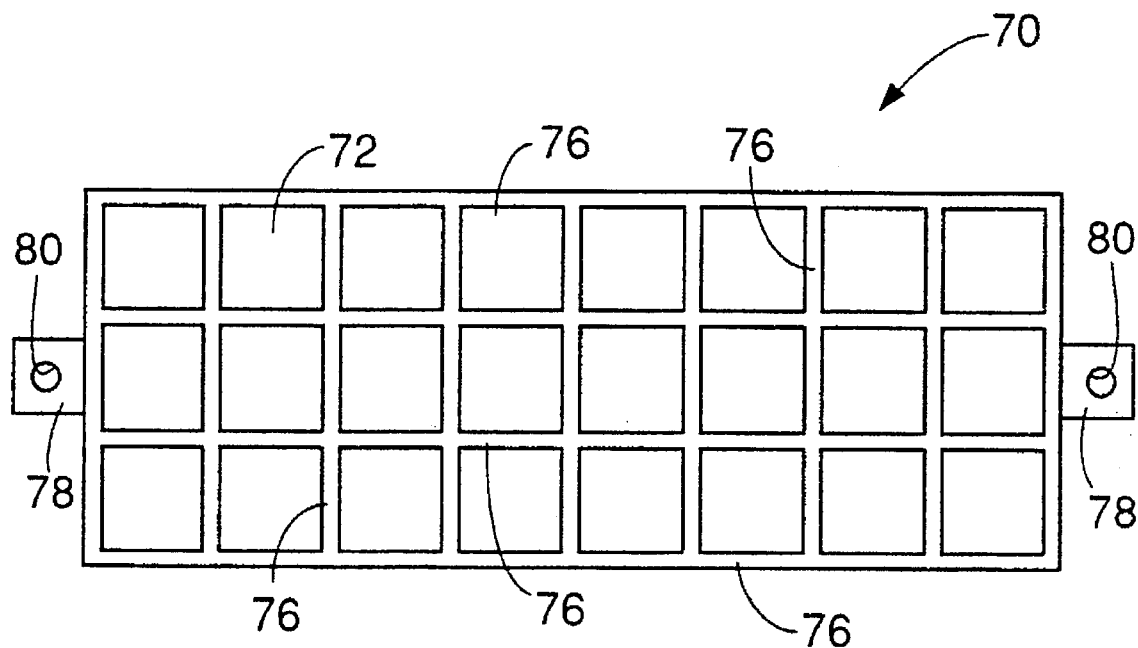
FIGS. 28 through 31 are bottom plan views corresponding to that of FIG. 26, showing tenth, eleventh, twelfth and thirteenth embodiments of a shock absorbing structure of the present invention.
Figure 29:
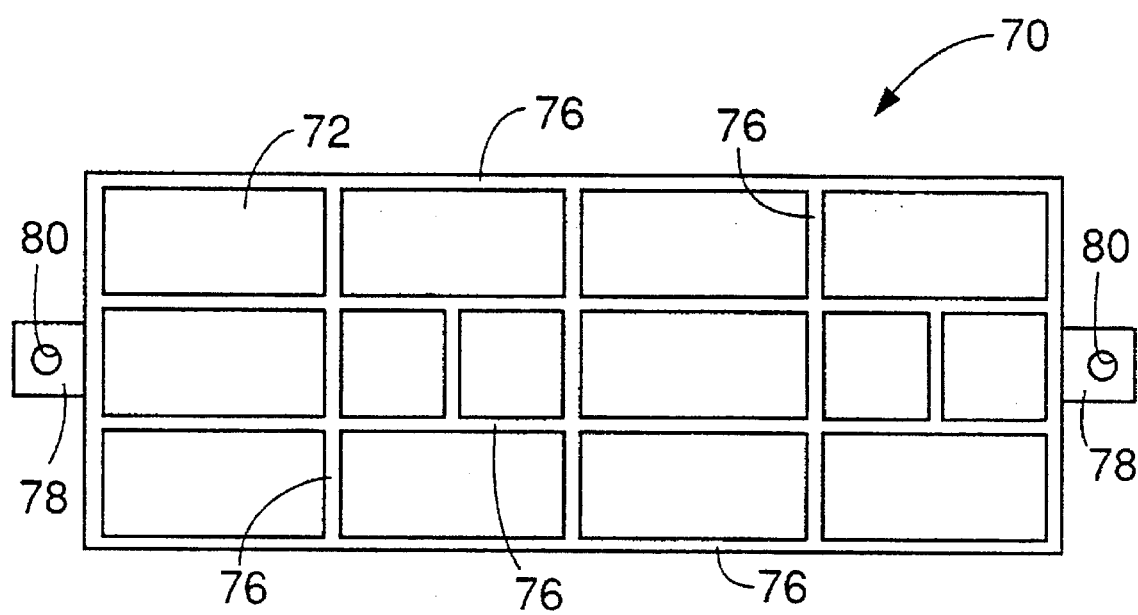
Figure 30:
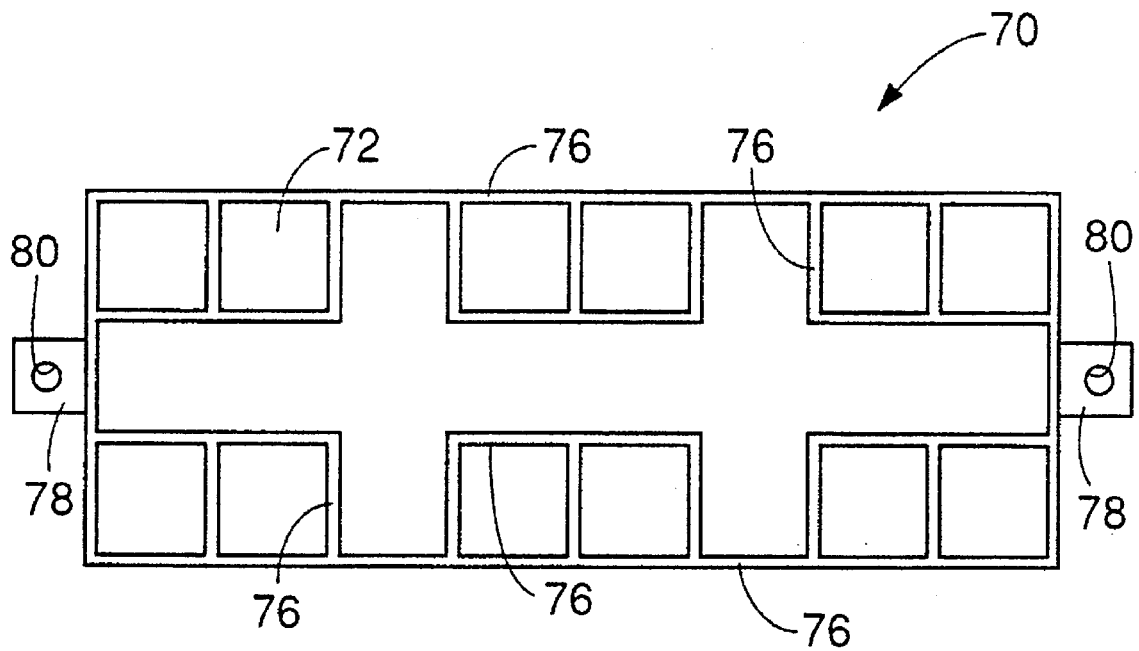
Figure 32:
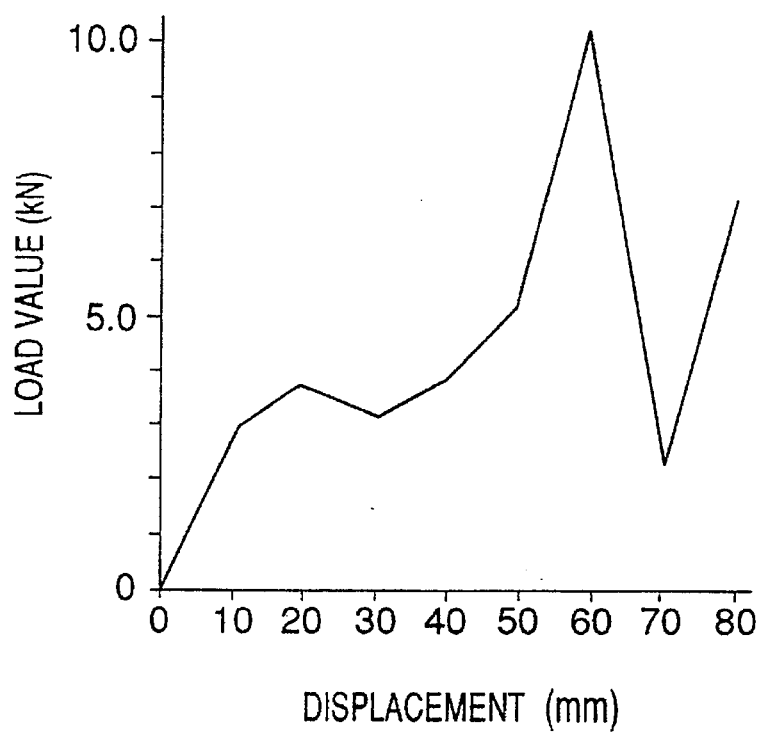
FIG. 32 is a graph indicating a load-displacement relationship of the shock absorbing structure of FIG. 28 formed of polyolefin having relatively low hardness.
Figure 33:
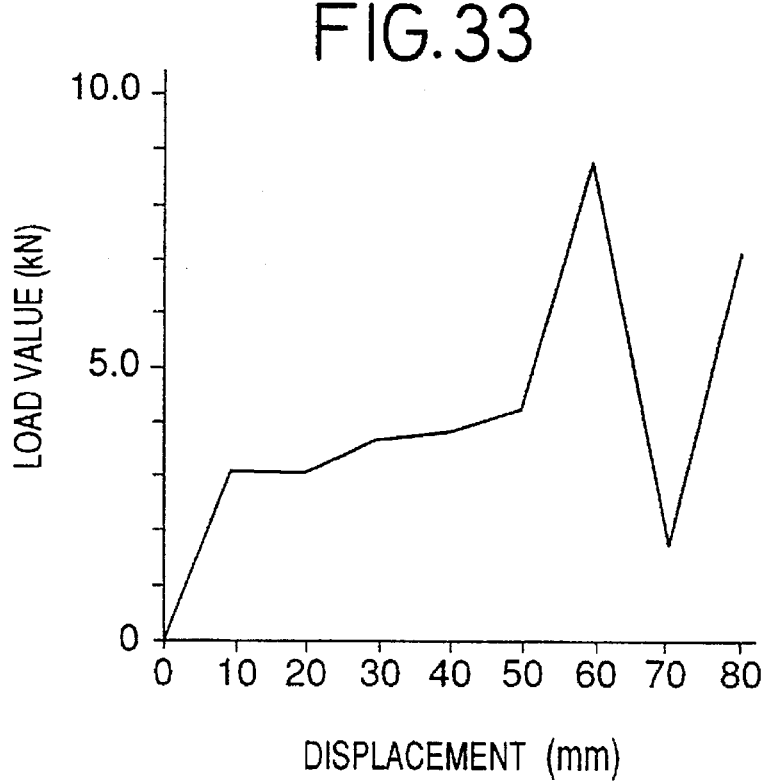
FIG. 33 is a graph indicating a load-displacement relationship of the shock absorbing structure of FIG. 29 formed of polyolefin having relatively low hardness.
Figure 34:
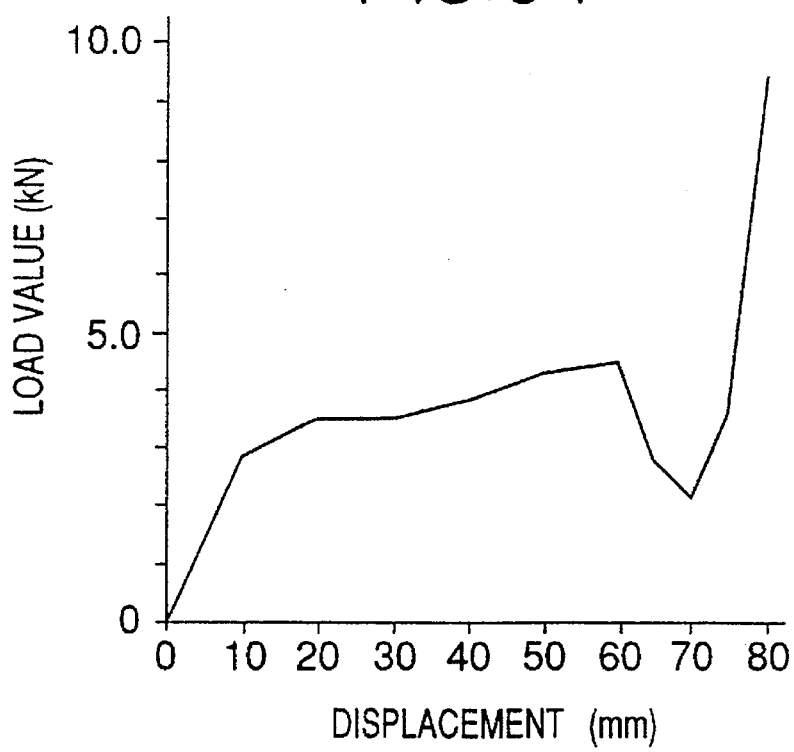
FIG. 34 is a graph indicating a load-displacement relationship of the shock absorbing structure of FIG. 30 formed of polyolefin having relatively low hardness.

It is apparent from FIGS. 32–34 that Samples 1–3 exhibited similar shock absorbing characteristics when the load was less than about 4 kN, but exhibited different characteristics when the load was larger than the above-indicated threshold. This means that only the first ribs 74 were fractured when the load is less than about 4 kN, and that the shock absorbing characteristic of the structure 70 during this period was derived from only that of the first ribs 74. The second ribs 76 began to be fractured when the load exceeded 4 kN, and the shock absorbing characteristic of the structure 70 during this period was derived from that of the second ribs 76 having different configurations as shown in FIGS. 28–30.

Figure 36:
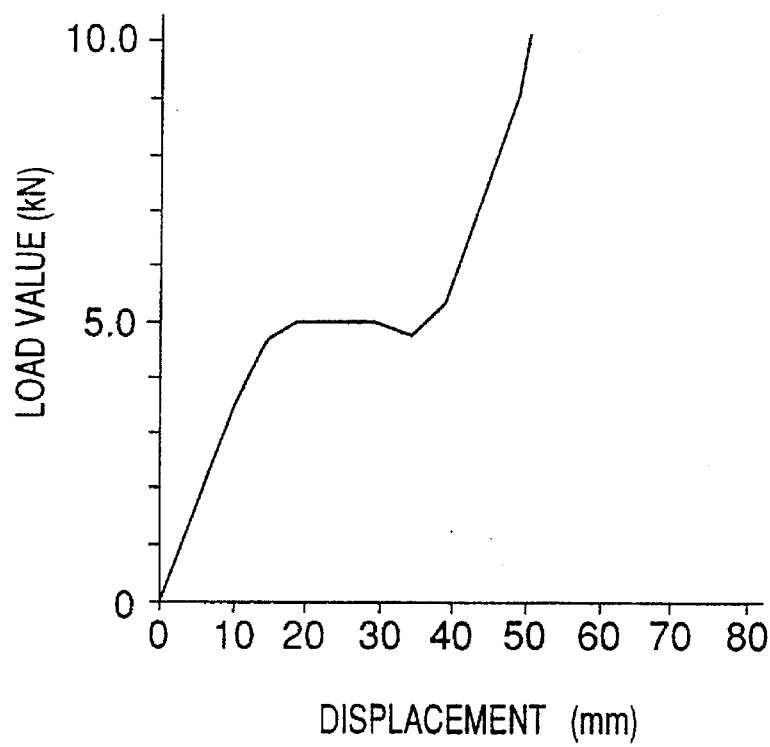
FIGS. 36 through 39 are graphs indicating load-displacement relationships of the respective shock absorbing structures of FIGS. 28, 29, 30 and 31 formed of polyolefin having relatively high hardness.
Figure 37:
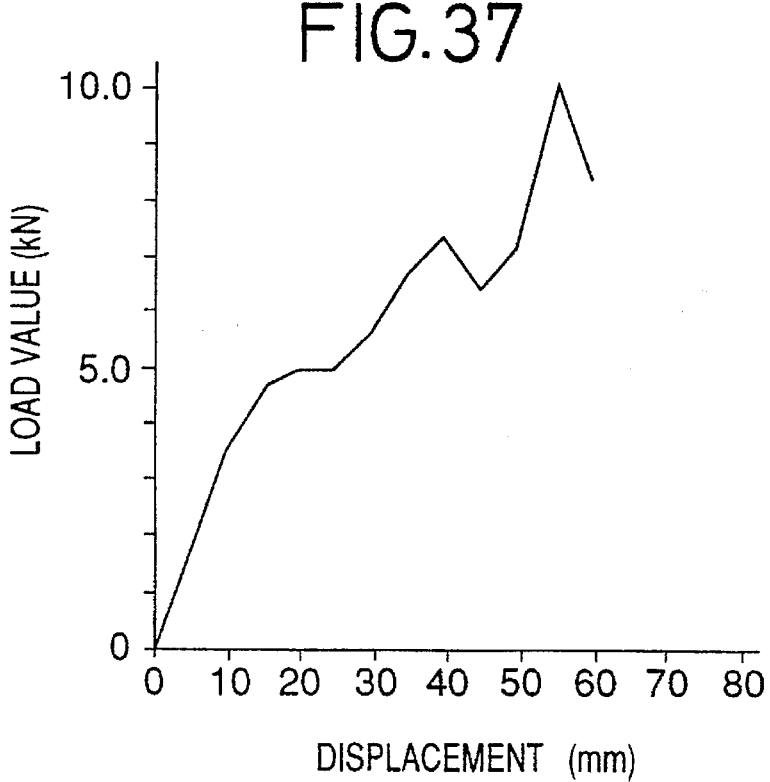
Figure 38:
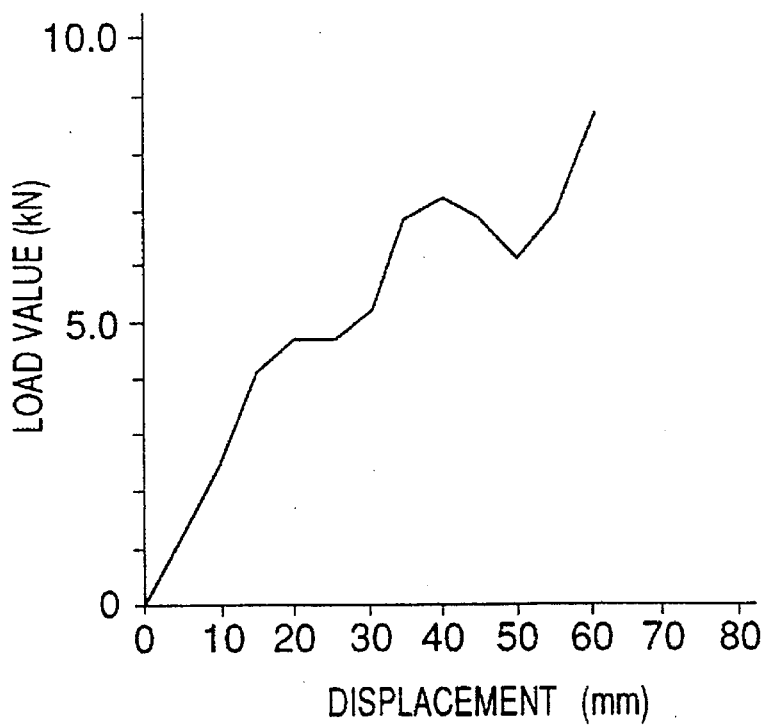

Similarly, it is apparent from FIGS. 36–38 that Samples 5–7 exhibited similar shock absorbing characteristics when the load was less than about 5 kN, and exhibited different characteristics when the load was larger than that threshold. This means that only the first ribs 74 were fractured when the load was less than about 5 kN, and that the shock absorbing characteristic of each Sample 5–7 during this period was derived from only that of the first ribs 74. The second ribs 76 began to be fractured when the load exceeded 5 kN, and the shock absorbing characteristic of each Sample 5–7 during this period was derived from that of the second ribs 76 having different configurations as shown in FIGS. 28–30.

Figure 31:
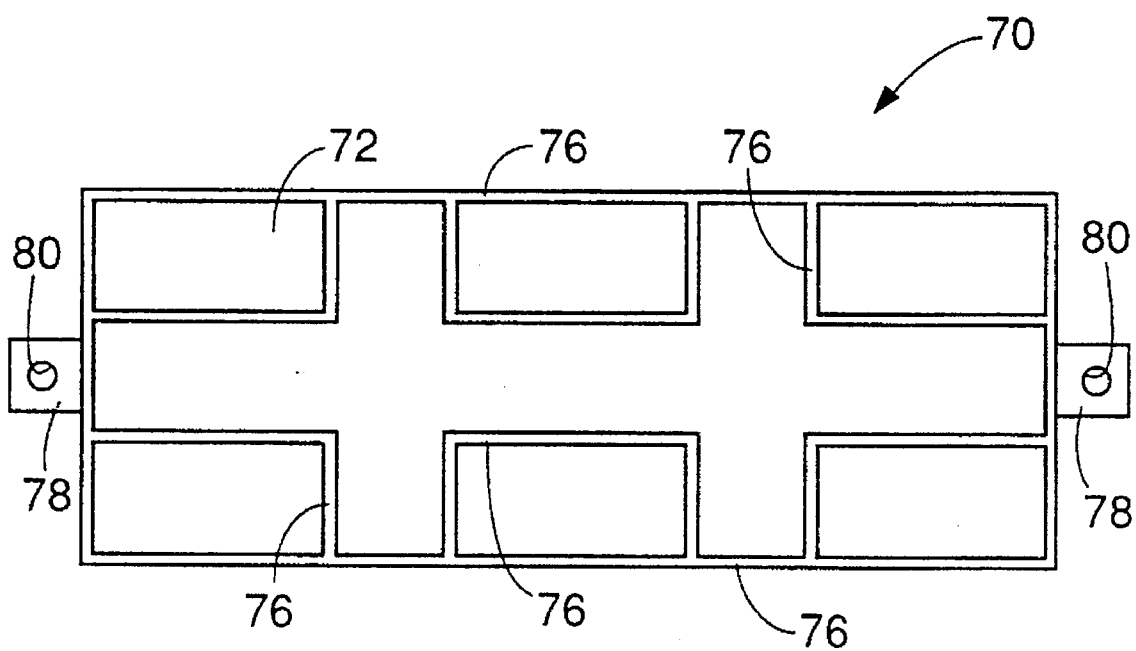
Figure 35:
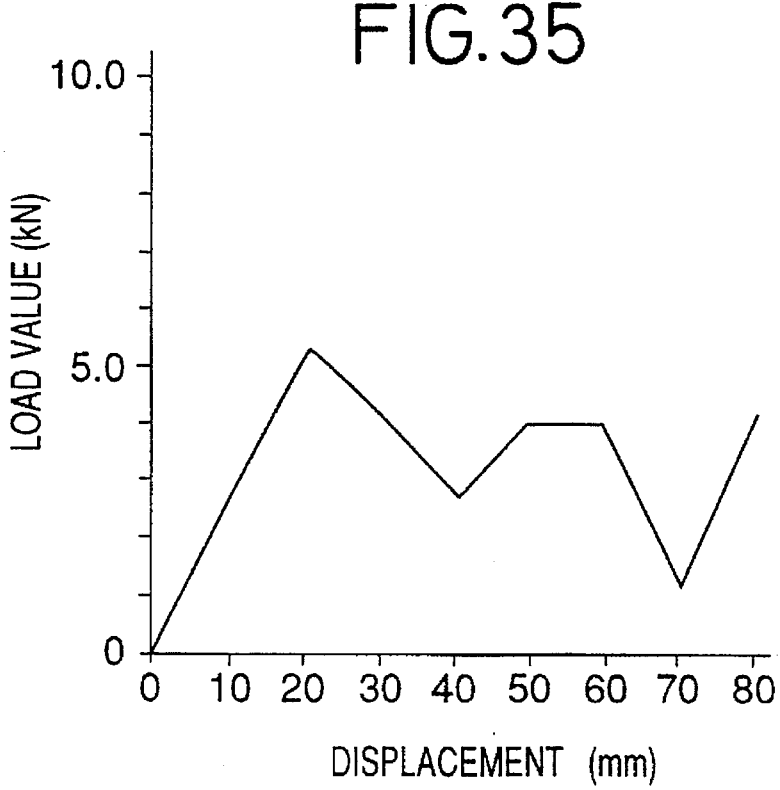
FIG. 35 is a graph indicating a load-displacement relationship of the shock absorbing structure of FIG. 31 formed of polyolefin having relatively low hardness.
Figure 39:
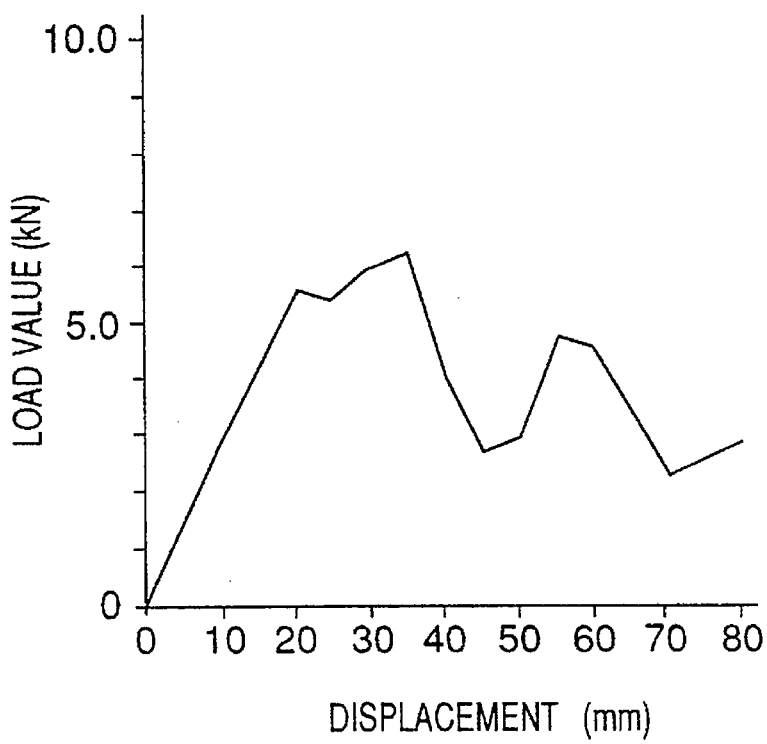

On the other hand, Samples 4 and 8 exhibited respective shock absorbing characteristics as shown in FIGS. 35 and 39, which are significantly different from those of Samples 1–3 and 5–7. It is noted that the second ribs 76 of these Samples 4, 8, which were constructed as shown in FIG. 31, have smaller fracture strength than the second ribs 76 of the other Samples, due to smaller total length as seen in the plane of FIG. 31. As a result, the second ribs 76 and the first ribs 74 were fractured at the same time even when the load was considerably small. The shock absorbing characteristics of these Samples 4 and 8 were derived from both the fracturing of the second ribs 76 and the fracturing of the first ribs 74.

It will be apparently recognized from the above results that a part or whole of the shock absorbing characteristic of the shock absorbing structure 70 can be tuned as needed, irrespective of the material for the structure 70, by providing the first ribs 74 and the second ribs 76 with different thickness values, spacing distances and height dimensions to give different fracture strength values. Thus, the shock absorbing structure 70 may be constructed to provide a desired shock absorbing characteristic.

In the illustrated embodiments of FIGS. 24–31, the shock absorbing structure 70 utilizes fracturing of the first ribs 74 and the second ribs 76 so as to absorb an impact energy when an impact force is applied to the structure 70. However, the structure 70 may be otherwise constructed so that the first ribs 74 and the second ribs 76 are deflected or otherwise deformed upon application of the impact force, so as to absorb the impact energy.

In the illustrated embodiments of FIGS. 24–31, the first ribs 74 and the second ribs 76 have different thickness values, different spacing distances and different height dimensions, so as to provide different fracture strength values. However, different fracture strength values can be obtained by changing only one or two of the thickness, spacing distance and height dimension of the ribs 74, 76. Further, the fracture strength of the ribs 74, 76 may be adjusted by changing other parameters which affect the fracture strength. When the structure 70 utilizes deformation of the first ribs 74 and the second ribs 76 for absorbing the impact energy, as described above, the structure 70 is suitably constructed so that the first and second ribs 74, 76 exhibit different deformation strengths. Further, the first and second ribs 74, 76 may have the same fracture or deformation strength.

While the shock absorbing structure 70 has a generally rectangular configuration as shown in FIGS. 24–31, the structure 70 may be suitably modified depending upon the shape of a vehicle component to which the structure 70 is attached, or the configuration of a space in which the structure 70 is accommodated.

While the first and second latticeworks or honeycomb bodies consisting of the first ribs 74 and second ribs 76 formed on the opposite surfaces of the base plate 72 have generally rectangular shapes, these latticeworks may also be modified as desired, depending upon the shapes of the vehicle component and the installation space within the component.

In the illustrated embodiments of FIGS. 24–31, the transverse plates of the first ribs 74 have a continuously varying height dimension, and the second ribs 76 have a smaller height dimension than the first ribs 74. However, all of the first ribs 74 may have the same height over the entire surface of the base plate 72. Further, the height of the first ribs 74 may be made equal to or smaller than that of the second ribs 76.

Moreover, the size of the base plate 72 may be determined as desired depending upon the vehicle component to which the structure 70 is attached.

The thickness values of the base plate 72, first ribs 74 and second ribs 76 may be determined as needed. Preferably, the thickness of the base plate 72 is greater than 1.5 mm and smaller than 5 mm, and the thickness of the first and second ribs 74, 76 is within a range of about 0.6–1.2 mm. If the thickness of the base plate 72 is not greater than 1.5 mm, the plate 72 is easily deformed or fractured upon application of an impact force, due to excessively small deformation strength or fracture strength thereof, thus making it difficult for the structure 70 to absorb the impact energy with high efficiency. If the thickness of the base plate 72 exceeds 5 mm, that is, if the base plate 72 is too thick, the time required for molding the structure 70 is increased, and the ribs 74, 76 formed integrally on the base plate 72 may be deformed due to a shrinkage difference between the ribs 74, 76 and the plate 72 upon cooling of the molded structure. This prevents the structure 70 from stably absorbing the impact energy. If the thickness of the first ribs 74 and second ribs 76 is less than 0.6 mm, that is, if the ribs 74, 76 are too thin, it is difficult to mold or otherwise form the ribs 74, 76. If the thickness of the ribs 74, 76 exceeds 1.2 mm, on the other hand, the deformation or fracture strength is too large, and the structure 70 is not able to absorb the impact energy with high efficiency, based on deformation or fracturing of the ribs 74, 76. In this sense, the thickness of the first and second ribs 74, 76 is desirably controlled to fall within the range of about 0.7 mm to 1.0 mm.

In the illustrated embodiments, the first ribs 74 and second ribs 76 are formed so as to constitute latticeworks on the opposite surfaces of the base plate 72. However, the ribs 74, 76 may be arranged in any other pattern or configuration, provided these ribs 74, 76 are formed over the entire areas of the opposite surfaces of the base plate 72. Where the first and second ribs 74, 76 are arranged as latticeworks or honeycomb bodies, in particular, it is desirable to minimize the size of each cell of the latticework or honeycomb patterns, without unnecessarily increasing the load value, so as to minimize a variation in the amount of the impact energy absorbed by the structure 70, which variation occurs depending upon the portion of the structure 70 to which an impact force is applied, or depending upon the direction in which the impact force acts on the structure 70. To this end, it is desirable that one of the adjacent two sides of each rectangular cell of the latticework have a length of 30–50 mm, and the other side of the cell have a length greater than 30 mm and not greater than 50 mm, as in the first embodiment of FIGS. 1–3.

The numbers of the first ribs 74 and second ribs 76 are by no means limited to those of the illustrated embodiment.

Like the shock absorbing structure 10 of the first embodiment, the shock absorbing structure 70 may preferably be formed of polyolefin resin, which has an Izod impact strength of not smaller than 5 kgcm/cm, and a tangent modulus of elasticity of 5000–20000 kg/cm$^2$, when it is used as a shock absorber to be attached to a door panel or a quarter panel, for absorbing an impact energy against the pelvic part of a vehicle passenger. Due to the use of polyolefin as the synthetic resin material, the shock absorbing structure 70 provides a sufficiently large impact displacement, and exhibits a shock absorbing characteristic as required for effectively absorbing the impact energy against the pelvic part of the passenger. More specifically, the polyolefin resin material may be selected from polyethylene, polypropylene, block copolymers thereof, random copolymers, and polymer alloys thereof.

While the mounting ears 78, 78 are formed on the outermost plates of the first rib 74 to attach the structure 70 to a vehicle component, these mounting ears 78, 78 may be eliminated, and an adhesive may be used instead for bonding the structure 70 to the vehicle component. It is also possible to form the shock absorbing structure 70 integrally with the vehicle component.

The first and second ribs 74, 76 may be modified so that the first ribs 74 have a greater fracture strength than the second ribs 76, whereby the second ribs 76 are deformed or fractured when the impact force is relatively small, and the first ribs 74 are deformed or fractured when the impact force is relatively large. Further, the first and second ribs 74, 76 may be constructed so that these ribs 74, 76 have the same fracture strength, and are adapted to be fractured at the same time when the structure 70 receives an impact force.

While the shock absorbing structure 70 is advantageously attached to the inside of a door panel of an automobile, the structure 70 is equally applicable to a other automobile components, such as quarter panel, pillar garnish, door grab, instrument panel or cluster, which require a shock absorbing structure.

It is to be understood that the present invention may be embodied with various other changes, modifications and improvements, which may occur to those skilled in the art, without departing from the spirit and scope of the invention as defined in the following claims.

What is claimed is:

1. A shock absorbing structure for a motor vehicle, comprising:

a base plate having a thickness greater than 1.5 mm; and a plurality of ribs formed on one of opposite major surfaces of said base plate, said ribs constituting a latticework having a plurality of rectangular cells each of which has two pairs of two adjacent sides, each of said ribs having a wall thickness in a range of 0.6–1.2 mm, one of said two adjacent sides of each of said cells having a first length of 30–50 mm, and the other one of said two adjacent sides having a second length greater than 30 mm and not greater than 50 mm;

said base plate and said ribs being formed of a synthetic resin material comprising polyolefin, said synthetic resin material having an Izod impact strength of not smaller than 5 kgcm/cm, and a tangent modulus of elasticity in a range of 5000–20000 kg/cm$^2$, such that said shock absorbing structure fractures upon impact with an object and maintains a substantially constant load during fracture.

2. A shock absorbing structure according to claim 1, wherein said synthetic resin material has a melt flow rate of not smaller than 20 g/10 min.

3. A shock absorbing structure according to claim 1, wherein each of said ribs has a draft angle in a range of 0.2°–1°.

4. A shock absorbing structure according to claim 1, wherein the structure is a molding formed by injection molding of said synthetic resin material.

5. A shock absorbing structure according to claim 1, wherein said ribs are formed integrally with said base plate.

6. A shock absorbing structure according to claim 1, wherein said base plate is provided with a pair of mounting portions for attachment to a component of the motor vehicle.

7. A shock absorbing structure according to claim 1, wherein the thickness of said base plate is not greater than 5 mm.

8. A shock absorbing structure according to claim 1, wherein the wall thickness of said ribs is in a range of 0.7–1.0 mm.

* * * * *